(12) United States Patent
Divakaran et al.

(10) Patent No.: US 12,207,203 B2
(45) Date of Patent: Jan. 21, 2025

(54) REGULATORY LIMIT COMPLIANT PACKET PRIORITY-BASED ADAPTIVE TRANSMIT POWER CONTROLLER

(71) Applicant: Intel Corporation, Santa Clara, CA (US)

(72) Inventors: Sudeep Divakaran, Bangalore (IN); Brent Elliott, Hillsboro, OR (US); Kwan Ho Lee, San Jose, CA (US); Gil Meyuhas, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 17/398,495

(22) Filed: Aug. 10, 2021

(65) Prior Publication Data

US 2023/0021077 A1 Jan. 19, 2023

(30) Foreign Application Priority Data

Jun. 23, 2021 (IN) .............................. 202141028124

(51) Int. Cl.
*H04W 52/22* (2009.01)
*H04W 52/26* (2009.01)
*H04W 52/28* (2009.01)
*H04W 52/36* (2009.01)

(52) U.S. Cl.
CPC ......... *H04W 52/281* (2013.01); *H04W 52/26* (2013.01); *H04W 52/367* (2013.01)

(58) Field of Classification Search
None
See application file for complete search history.

(56) References Cited

U.S. PATENT DOCUMENTS

| 6,919,845 | B2* | 7/2005 | Ozaki ................ G01R 29/0814 324/260 |
| 7,554,937 | B2* | 6/2009 | Lim ..................... H04B 7/1858 370/320 |
| 8,208,456 | B2* | 6/2012 | Helmersson .......... H04L 1/1812 370/335 |
| 8,214,003 | B2* | 7/2012 | Wong ................... H04B 1/3888 455/90.3 |
| 8,787,996 | B2* | 7/2014 | Friedlander .......... H04B 17/318 455/425 |

(Continued)

*Primary Examiner* — Tuan A Tran
(74) *Attorney, Agent, or Firm* — Schwegman Lundberg & Woessner, P.A.

(57) ABSTRACT

A wireless device includes one or more antennas coupled to a transmit (TX) chain. The TX chain is configured to generate output RF signals using baseband signals. The TX chain includes a TX power controller configured to classify a packet of the output RF signals into a priority category of a plurality of priority categories based on priority information within the packet. The TX power controller is further to determine a time average specific absorption rate (TAS) energy budget of the wireless device. The TAS energy budget is based on a pre-configured regulatory power limit (e.g., SAR transmit power limit) of the wireless device over a time interval. Transmission power for transmitting the packet is determined based on the priority category and the TAS energy budget. The packet is encoded for transmission via the one or more antennas using the determined transmission power.

23 Claims, 12 Drawing Sheets

(56) References Cited

U.S. PATENT DOCUMENTS

| | | | | |
|---|---|---|---|---|
| 8,929,828 B2* | 1/2015 | Hochwald | | H04B 7/0617 |
| | | | | 455/67.11 |
| 9,036,556 B2* | 5/2015 | Park | | H04W 52/365 |
| | | | | 370/328 |
| 9,167,446 B2* | 10/2015 | Sikri | | H04W 88/08 |
| 9,407,309 B2* | 8/2016 | Lee | | H04B 1/3838 |
| 9,515,378 B2* | 12/2016 | Prasad | | H01Q 1/245 |
| 10,484,075 B1* | 11/2019 | Maheshwari | | H04W 24/02 |
| 10,812,125 B1* | 10/2020 | Badic | | H04W 72/542 |
| 11,184,862 B2* | 11/2021 | Kim | | H04W 52/365 |
| 11,336,319 B2* | 5/2022 | Badic | | H04W 72/51 |
| 2021/0022170 A1* | 1/2021 | Lu | | H04W 72/121 |
| 2022/0302946 A1* | 9/2022 | Jadhav | | H04W 52/283 |
| 2023/0232336 A1* | 7/2023 | Lagnado | | H04W 52/225 |
| | | | | 370/318 |

* cited by examiner

REGULATORY LIMIT COMPLIANT PACKET PRIORITY-BASED ADAPTIVE TRANSMIT POWER CONTROLLER

This application claims the benefit of priority to Indian Patent Application No. 202141028124, filed Jun. 23, 2021, which is incorporated herein by reference in its entirety.

TECHNICAL FIELD

Various embodiments generally may relate to the field of radio frequency (RF) signal communication by a wireless device, including a regulatory limit compliant (e.g., Specific Absorption Rate (SAR) compliant) packet priority-based adaptive transmit power controller.

BACKGROUND

With the increased popularity of wireless communications such as fifth-generation (5G) communications and subsequent sixth-generation (6G) communications, there is a growing demand for increased flexibility and efficiency in using the communication bandwidth by wireless devices, including reducing uplink packet transmission delay and end-to-end (E2E) latency while complying with SAR regulations.

BRIEF DESCRIPTION OF THE DRAWINGS

In the drawings, like numerals may describe the same or similar components or features in different views. Like numerals having different letter suffixes may represent different instances of similar components. Some embodiments are illustrated by way of example, and not limitation, in the figures of the accompanying drawings in which.

DETAILED DESCRIPTION

Figure 1:
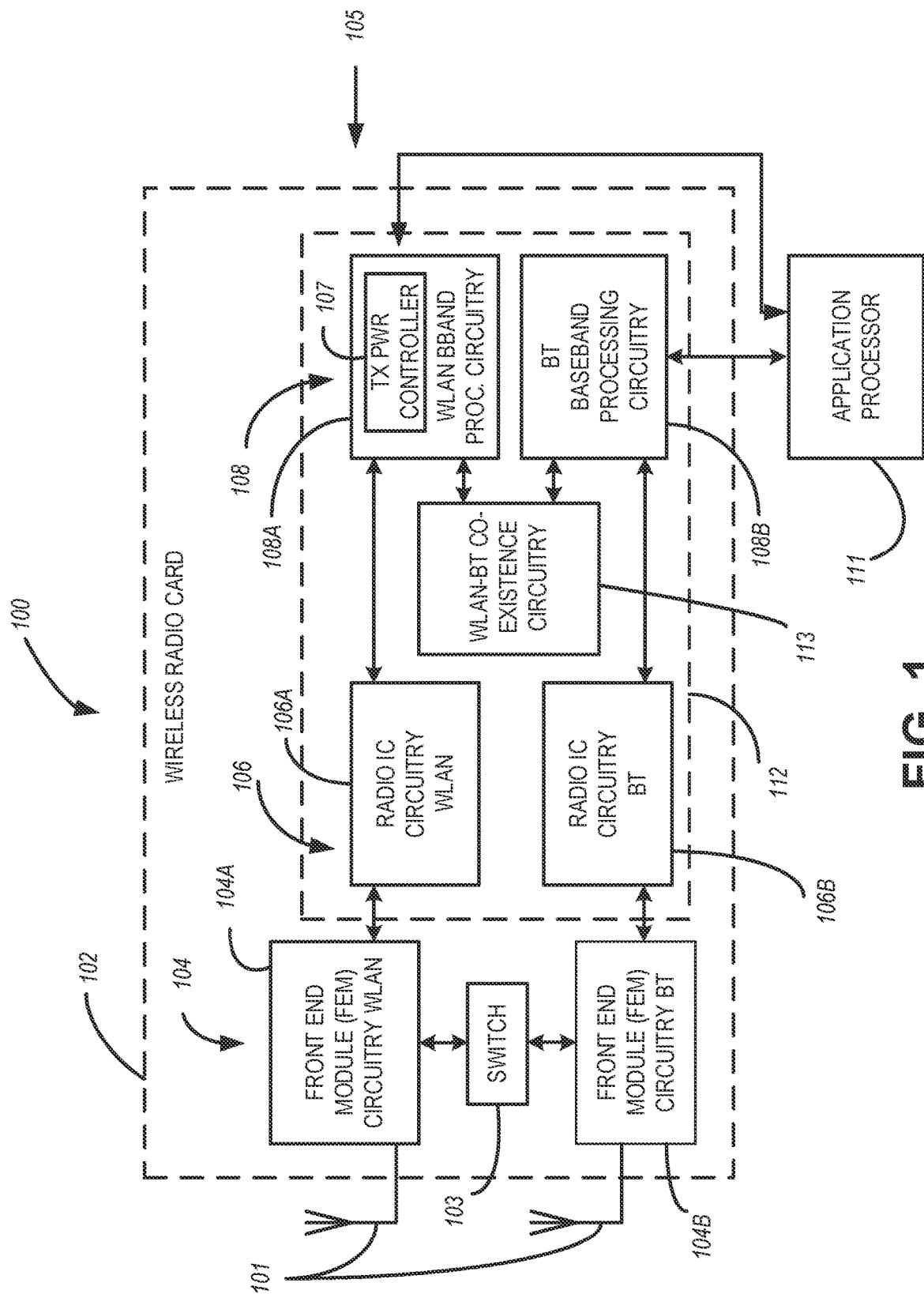
FIG. 1 is a block diagram of a radio architecture with a transmit power controller, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments outlined in the claims encompass all available equivalents of those claims.

Networking applications end-to-end (E2E) latency plays a key role in over quality of experience for the user, and can depend on various factors such as network latency, Cloud compute service provider (CSP) latency, wireless link latency (e.g., latency based on channel congestion, channel noise, the distance of the device from the access point, the Wi-Fi technology standard used, etc.). In addition, compliance with regulations (e.g., SAR compliance) may be mandatory and ensures the transmit power is within the safety limits, which puts a constraint on the maximum transmit power allowed when the device is close to the human body.

Uplink (UL) packet transmit (TX) delay has a cascading impact on downlink packet latencies in the E2E latency between a client device and a cloud server. Even though high-priority packets can be prioritized using tags (e.g., Differentiated Services Code Point, or DSCP, tags), at the analog RF power level for WLAN/wireless wide area network (WWAN) bearer, there is no concept of prioritization. In some aspects, low TX power can cause packet errors (especially when the transmission is far from the access point (AP)) and results in packet retransmissions or even losses. Moreover, for latency-sensitive traffic, jitter at the sender side can have a significant impact on uplink latency (e.g. degraded mean opinion score (MOS) for audio/video packets) and cascading latency degradation effect for downlink response packets. In some aspects, sending all packets at maximum power (especially when far from the AP or radio base stations) is not possible as it may violate SAR compliance. Furthermore, existing time averaging SAR (TAS) techniques do not consider the packet priority that is being transmitted when TX power is increased or decreased.

Currently, high user priority packets (e.g. video packets, voice packets, or other latency-sensitive packets) are treated no differently from other best effort (BE) or background (BK) packets at the RF physical (PHY) layer transmission level. As a result, latency incurred for critical UL high priority packets due to lower transmit power impacts quality of experience (QoE) and key experience indexes (KEIs) for wireless applications. Moreover, existing power management techniques do not include standards support for a Layer 3 or above layer (e.g., application layer) to control RF transmit power based on packet type/priority.

In some aspects, to meet SAR compliance, WLAN/WWAN clients may use different techniques to change transmit power. Such techniques may include sensing user proximity (e.g., using proximity sensors) or using a specific duty cycle (e.g., TAS). Additionally, in WLAN and WWAN, standards support for packet categorization may be used. For example, the IEEE 802.11e (Wi-Fi Multimedia or WMM) standard enables categorization of traffic based on packet priority settings set by an application (which settings are mapped to Internet Engineering Task Force (IETF) DSCP tags). In 3GPP standards, a QoS Class Identifier (QCI), which maps to DSCP, may be used.

As used herein, the terms SAR and SAR compliance are associated with various regulations indicating that the average transmit power of a wireless device over a specific period is below a certain threshold when the device is close to the human body. The transmit power can be reduced dynamically based on sensor inputs detecting human body presence. Another sensor-less approach is to use a time averaging SAR technique where the transmit power increases and decreases are duty-cycled in such a way that the average transmit power during a specific period (e.g., integral power over a SAR window) is within the average SAR limits. However, conventional techniques for SAR compliance do not take into account the packet type.

Techniques disclosed herein can be used for SAR compliant packet priority-based adaptive transmit power scheduling and control using a transmit (TX) power controller associated with a TX chain of a wireless device. For example, the disclosed TX power controller takes into account packet prioritization while determining the transmit power of a packet and meeting overall SAR compliance. The TX power controller further uses time averaging SAR (TAS) based processing in the WLAN/WWAN firmware, which is made adaptive based on specific packet tagging or types information including QoS tagging, user priority information, packet type or priority, and other settings that may be present in the transmitted packet header. In some aspects, the WLAN/WWAN RF transmit power controller firmware may implement an adaptive algorithm such that high user priority packets (e.g., as tagged by an application) are transmitted at maximum (or highest possible) transmit power relative to the other packets. Additionally, when TAS energy budget (also referred to as TAS credits) are low, or at any other triggering, the TX power controller may limit transmit power of low priority packets to below platform legacy SAR limit value to gain energy budget to allow high priority packets to transmit above SAR limit value. As used herein, the term "TAS energy budget" refers to a pre-configured SAR transmit power limit of a wireless device over a time interval.

The disclosed functionalities associated with the TX power controller may be used in connection with packet classification based on priority information and uplink packet transmission prioritization with SAR limits, ensuring average SAR compliance is met by the wireless device using the disclosed TX power controller. For example, transmitting high-priority packets at higher power ensures lower packet losses or errors, which improves E2E latency. Additionally, determining transmission power based on packet prioritization will be useful in high channel noise conditions or when the wireless device is away from the Wi-Fi access point so that QoE of latency-sensitive applications improves at larger ranges. The disclosed techniques also leverage a low-cost sensor-less time averaging SAR solution to integrate scheduling by the QoS-based adaptive transmit power controller in a WLAN module transmit chain (or other transmit chains as well). Additional functionalities of the power controller are discussed in connection with at least FIGS. 1, 4, 6, and 8-12.

FIG. 1 is a block diagram of a radio architecture 100 with a transmit power controller, in accordance with some embodiments. The radio architecture 100 may be implemented in a computing device (e.g., device 1300 in FIG. 13) including user equipment (UE), a base station (e.g., a next generation Node-B (gNB), enhanced Node-B (eNB)), a smartphone, or another type of wired or wireless device. The radio architecture 100 may include radio front-end module (FEM) circuitry 104, radio integrated circuit (IC) circuitry 106, and baseband processing circuitry 108. Radio architecture 100 as shown includes both Wireless Local Area Network (WLAN) functionality and Bluetooth (BT) functionality although embodiments are not so limited and the disclosed techniques apply to other types of radio architectures as well. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals, and to provide the amplified versions of the received signals to the WLAN radio IC circuitry 106A for further processing. The BT FEM circuitry 104B may include a receive signal path which may include circuitry configured to operate on BT RF signals received from the one or more antennas 101, to amplify the received signals and to provide the amplified versions of the received signals to the BT radio IC circuitry 106B for further processing. The FEM circuitry 104A may also include a transmit signal path which may include circuitry configured to amplify WLAN signals provided by the radio IC circuitry 106A for wireless transmission by the one or more antennas 101. Besides, the FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited and include within their scope the use of a FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. The BT radio IC circuitry 106B may, in turn, include a receive signal path which may include circuitry to down-convert BT RF signals received from the FEM circuitry 104B and provide baseband signals to BT baseband processing circuitry 108B. The WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. The BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform (FFT) or Inverse Fast Fourier Transform (IFFT) block (not shown) of the WLAN baseband processing circuitry 108A. Each of the WLAN baseband processing circuitry 108A and the BT baseband processing circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with the application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband processing circuitry 108A and the BT baseband processing circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the one or more antennas 101 are depicted as being respectively connected to the WLAN FEM circuitry 104A and the BT FEM circuitry 104B, embodiments include within their scope the sharing of the one or more antennas 101 as between the WLAN and BT FEMs, or the provision of more than one antenna connected to each of FEM 104A or 104B.

In some embodiments, the front-end module circuitry 104, the radio IC circuitry 106, and the baseband processing circuitry 108 may be provided on a single radio card, such as wireless radio card 102. In some other embodiments, the one or more antennas 101, the FEM circuitry 104, and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers. In some embodiments, the wireless radio card 102 may include a platform controller hub (PCH) system-on-a-chip (SOC) and a central processing unit (CPU)/host SOC.

In some of these multicarrier embodiments, radio architecture 100 may be part of a Wi-Fi communication station (STA) such as a wireless access point (AP), a base station, or a mobile device including a Wi-Fi enabled device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, IEEE 802.11-2016, and/or 802.11ax standards and/or proposed specifications for WLANs, although the scope of embodiments is not limited in this respect. Radio architecture 100 may also be suitable to transmit and/or receive communications in accordance with other techniques and standards, including a $3^{rd}$ Generation Partnership Project (3GPP) standard, including a communication standard used in connection with 5G or new radio (NR) communications.

In some embodiments, the radio architecture 100 may be configured for high-efficiency (HE) Wi-Fi communications in accordance with the IEEE 802.11ax standard or another standard associated with wireless communications. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband processing circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection-oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as the single wireless radio card 102, although embodiments are not so limited, and include within their scope discrete WLAN and BT radio cards In some embodiments, the radio architecture 100 may include other radio cards, such as a cellular radio card configured for cellular (e.g., 3GPP such as LTE, LTE-Advanced, or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

Figure 4:
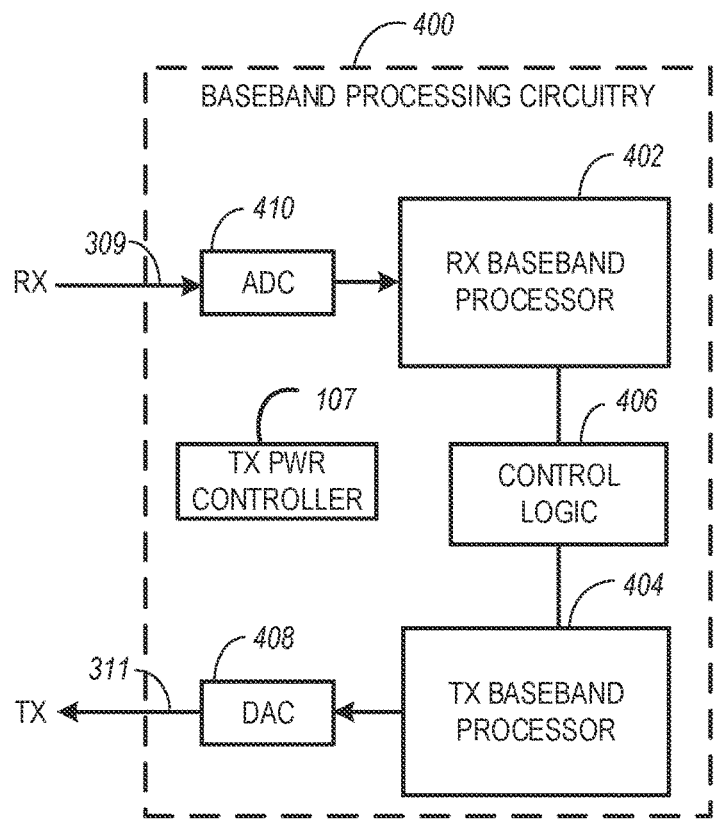
FIG. 4 illustrates a baseband processing circuitry with a transmit power controller for use in the radio architecture of FIG. 1, in accordance with some embodiments.

In some embodiments, the radio architecture 100 includes a TX power controller 107 configured to perform the disclosed functionalities associated with packet classification based on priority information and uplink packet transmission prioritization with SAR limits, ensuring average SAR compliance is met by the wireless device using the disclosed TX power controller. In this regard, the TX power controller 107 is configured to control one or more power amplifiers (PAs), such as the PAs in the WLAN FEM 104A (as illustrated in FIG. 4), in connection with performing the disclosed functions. In some embodiments, the TX power controller 107 is associated with a TX chain of the radio architecture 100. As used herein, the term "TX chain" (or "transmit chain") indicates different types of transceiver circuitry forming a transmit path. For example, the TX power controller 107 may be part of transmit chain 105, formed by signal transmit paths of the WBPC 108A, the WLAN radio IC circuitry 106A, the WLAN FEM circuitry 104A, and the one or more antennas 101.

Even though the TX power controller 107 is illustrated as being part of the WBPC 108A, the disclosure is not limited in this regard, and the TX power controller 107 may be part of other circuitry of the transmit chain 105. Additionally, even though a single TX power controller 107 is illustrated in FIG. 1, the disclosure is not limited in this regard and the radio architecture 100 may include a separate TX power controller for each of a plurality of different transmit chains (e.g., each transmit chain may be associated with a different wired or wireless protocol or standard). More specifically, the disclosed techniques associated with functionalities of the TX power controller may be applied to transmission chains in any wireless technology that needs to meet SAR compliance and can benefit from adaptive transmit power based on packet priority. In other aspects, a single TX power controller may be configured to control TX power for multiple transmit chains using the disclosed techniques.

In some aspects, the TX power controller 107 may use priority information to perform packet classification. The priority information may include the following: (a) Differentiated Services Code Point (DSCP) tags for packets (e.g., indicating voice, video, or another higher priority packet); (b) Type of Service (TOS) information or similar standardized or proprietary information in headers or fields within the frame/packet; (c) Aggregation Control Information (e.g., information indicating whether a packet is a Retry Packet or a packet that is not in an aggregated media access control (MAC) protocol data unit (A-MPDU)); (d) Information indicative of wireless frame type (e.g., a management frame, a control frame, or a data frame); (e) Information based on inferring the reliability requirement from the DSCP, class of service (COS), TOS, or similar standardized or proprietary headers or fields within the frame/packet (applications generating these frames/packets may use protocol-specific means to identify frames requiring enhanced reliability that are out of scope for this invention disclosure); and (f) Information based on frame inspection against a series of rules/policies to identify frames which meet defined criteria (the wireless device may use y provide APIs to enable population or interrogation of these inspection rules/policies.

In some aspects, the TX power controller 107 is configured to perform uplink packet transmission prioritization with SAR limits based on configuring transmission at optimal power for reduced failures in WWAN, WLAN, or other types of transmit chains, while meeting SAR compliance (e.g., scheduling packet transfer with maximum transmit power or transmit power distribution within energy budget). The uplink packet transmission prioritization with SAR limits performed by the TX power controller 107 further includes configuring packet transmit power within the TAS energy budget by, e.g., scheduling packet transmission based on the energy budget and prior information (e.g., packet type information). In aspects associated with a WLAN transmit chain, the packet transmission is scheduled by conditioning the back-off times depending on packet types (e.g., control or management frames) and energy budget.

Example functionalities of the TX power controller are also discussed herein at least in connection with FIGS. 4, 6, and 8-12.

Figure 2:
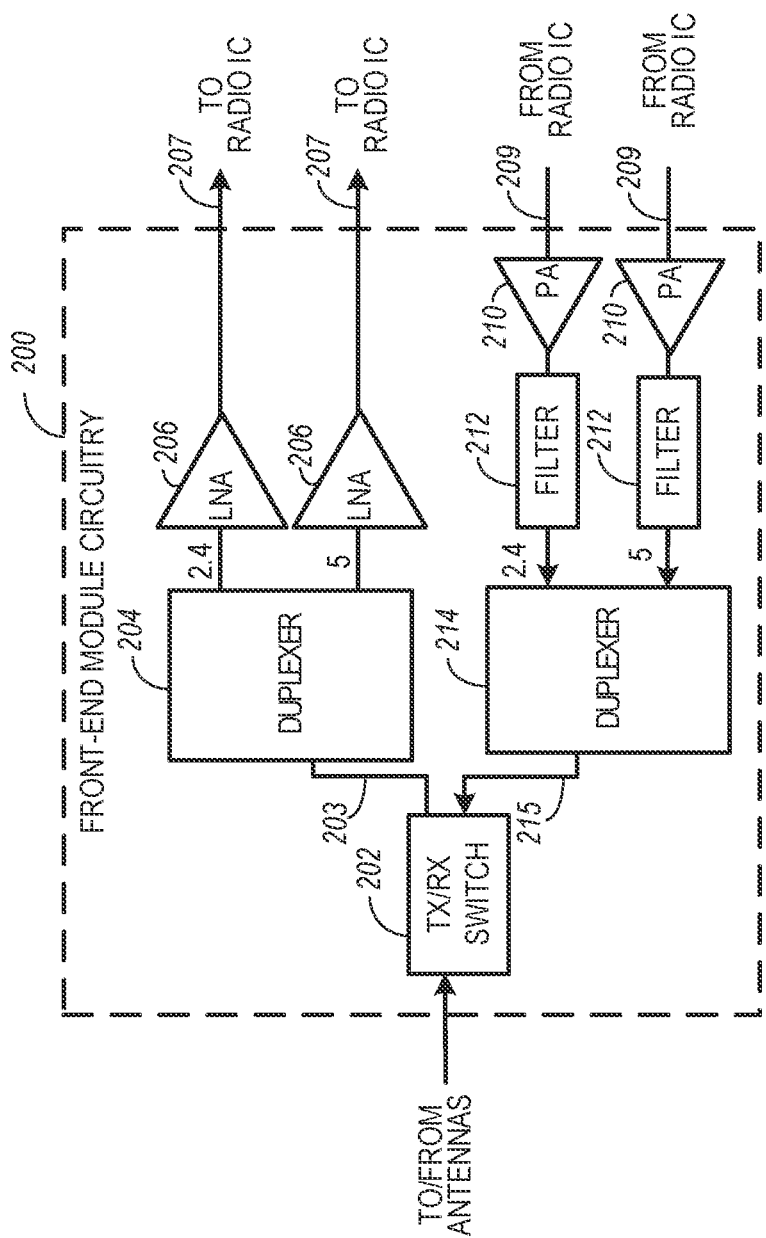
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit (TX) mode and receive (RX) mode operation. In some aspects, a diplexer may be used in place of a TX/RX switch. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the FEM circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by the one or more antennas 101 (FIG. 1)).

In some dual-mode embodiments for Wi-Fi communication, the FEM circuitry 200 may be configured to operate in, e.g., either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier (PA) 210 and one or more filters 212, such as a BPF, an LPF, or another type of filter for each frequency spectrum, and a transmit signal path duplexer 214 to provide the signals of one of the different spectrums onto a single transmit path for subsequent transmission by the one or more antennas 101 (FIG. 1). In some embodiments, BT communications may utilize the 2.4 GHz signal paths and may utilize the same FEM circuitry 200 as the one used for WLAN communications.

In some embodiments, the TX power controller 107 is configured to perform the disclosed functions and adjust transmission power via the PA 210.

Figure 3:
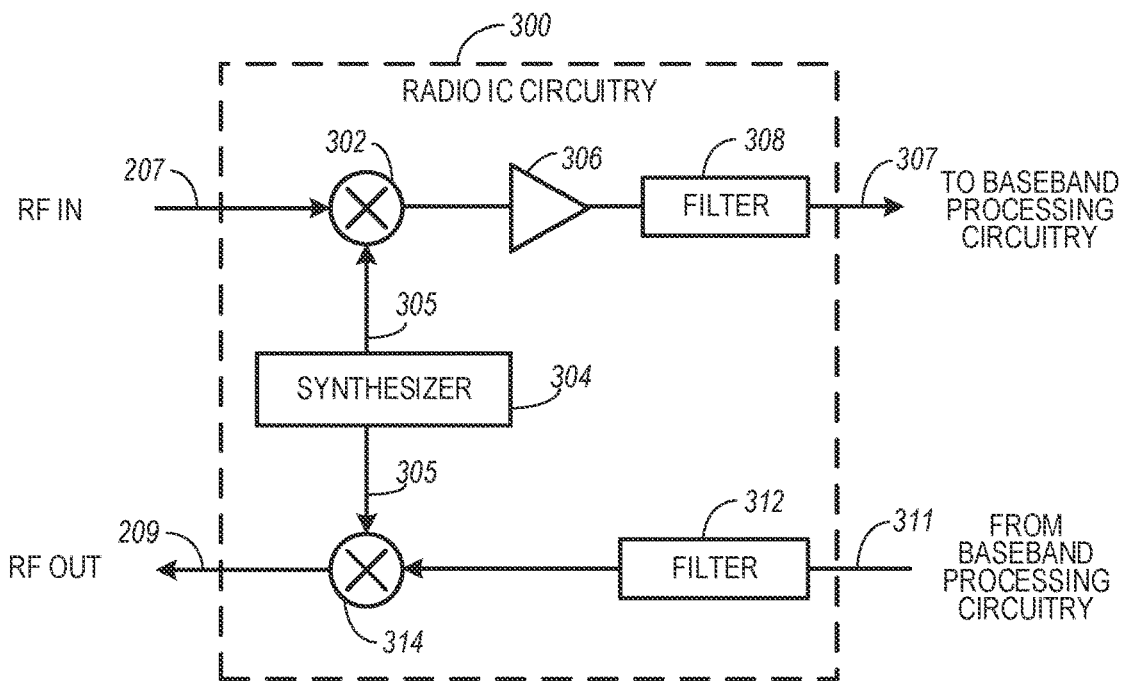
FIG. 3 illustrates a radio IC circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include mixer circuitry 302, such as, for example, down-conversion mixer circuitry, amplifier circuitry 306, and filter circuitry 308. The transmit signal path of the radio IC circuitry 300 may include at least filter circuitry 312 and mixer circuitry 314, such as up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry and may include, although not shown, embodiments where each of the depicted circuitries may include more than one component. For instance, mixer circuitry 302 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by the synthesizer circuitry 304. The amplifier circuitry 306 may be configured to amplify the down-converted signals and the filter circuitry 308 may include an LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include an LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of the synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature-phase (Q) paths). In such an embodiment, RF input signal 207 from FIG. 2 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer circuitry 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in the duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature-phase (Q) path) may operate at a 25% duty cycle, which may result in a significant reduction in power consumption.

The RF input signal 207 (FIG. 2) may comprise a balanced signal, although the scope of the embodiments is not limited in this respect. The I and Q baseband output signals may be provided to the low-noise amplifier, such as amplifier circuitry 306 (FIG. 3) or to filter circuitry 308 (FIG. 3).

In some embodiments, the output baseband signals 307 and the input baseband signals 311 may be analog, although the scope of the embodiments is not limited in this respect. In some alternate embodiments, the output baseband signals 307 and the input baseband signals 311 may be digital. In these alternate embodiments, the radio IC circuitry may include an analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. In some embodiments, the synthesizer circuitry 304 may be a delta-sigma synthesizer, a frequency multiplier, or a synthesizer comprising a phase-locked loop with a frequency divider. According to some embodiments, the synthesizer circuitry 304 may include a digital frequency synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage-controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include an analog-to-digital converter (ADC) 410 to convert analog baseband signals 309 received from the radio IC circuitry 106 to digital baseband signals for processing by the RX BBP 402. In these embodiments, the baseband processing circuitry 400 may also include a digital-to-analog converter (DAC) 408 to convert digital baseband signals from the TX BBP 404 to analog baseband signals 311.

In some embodiments that communicate OFDM signals or OFDMA signals, such as through the WBPC 108A, the TX BBP 404 may be configured to generate OFDM or OFDMA signals as appropriate for transmission by performing an inverse fast Fourier transform (IFFT). The RX BBP 402 may be configured to process received OFDM signals or OFDMA signals by performing an FFT. In some embodiments, the RX BBP 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the one or more antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. The one or more antennas 101 may each include a set of phased-array antennas, although embodiments are not so limited.

Although the radio architecture 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

In some embodiments, the baseband processing circuitry 400 (which may be configured as part of a transmit chain within a wireless device) further includes the TX power controller 107 performing SAR compliant packet priority-based transmission-related functions as discussed herein. For example, the TX power controller 107 is configured to classify a packet of output RF signals into a priority category of a plurality of priority categories based on priority information within the packet. The TX power controller 107 is further configured to determine a time average specific absorption rate (TAS) energy budget of the wireless device. The TAS energy budget is based on a pre-configured SAR transmit power limit of the wireless device over a time interval. The TX power controller 107 is further configured to determine transmission power for transmitting the packet based on the priority category and the TAS energy budget, and encode the packet for transmission via the one or more antennas using the determined transmission power.

Optimal transmit power may be needed in aspects where the client device is far from the access point or base station to minimize retransmissions or packet loss. In such aspects, to ensure optimal QoE, the TX power controller 107 is configured to apply the disclosed techniques and transmit high user priority packets with the least number of packet errors. However, though packet tagging and other WLAN MAC-level packet classification and aggregation may be used (e.g., transmit packet traffic flow access categorization based on user profiles as well as MAC service data unit (MSDU) and MAC protocol data unit (MPDU) packet aggregation schemes) to reduce latencies like the TX power controller 107 may also use packet classification at the Internet Protocol (IP) transport level to reduce latency. For example, DSCP (IETF standard), TOS, and other standardized or proprietary methods may be used to differentiate between high and low priority packets. The same is also leveraged by WLAN standards, like in the case of DSCP tags, which are mapped to IEEE 802.1d and 802.11e defined user profiles or access categories (e.g., AC_VO for voice, AC_VI for video, AC_BE for best effort, and AC_BK for background). The example access category mapping is illustrated in TABLE 1 below (from an 802.11 specification).

TABLE 1

| Priority | UP (Same as IEEE 802.1D user priority) | IEEE 802.1D designation | AC | Transmit queue | Transmit queue | Designation (informative) |
|---|---|---|---|---|---|---|
| Lowest | 1 | BK | AC_BK | BK | BK | Background |
| | 2 | — | AC_BK | BK | BK | Background |
| | 0 | BE | AC_BE | BE | BE | Best Effort |
| | 3 | EE | AC_BE | BE | BE | Best Effort |
| | 4 | CL | AC_VI | VI | A_VI | Video (alternate) |
| | 5 | VI | AC_VI | VI | VI | Video (primary) |
| | 6 | VO | AC_VO | VO | VO | Voice (primary) |
| Highest | 7 | NC | AC_VO | VO | A_VO | Voice (alternate) |

In some embodiments, WLAN packet type or sub-type (which is part of the MAC header) may be used as priority information by the TX power controller 107 to classify the packet and determine transmission power based on the priority category and the TAS energy budget. In some aspects, packet type information (e.g., information identifying the packet type as a data frame, a control frame, or a management frame) can also be used as priority information to determine packet prioritization over the air link.

In some embodiments, the TX power controller 107 may use QoS mapping of traffic to different priority bearers in connection with WWAN transmission chains for performing the disclosed functions. The Third Generation Partnership Project (3GPP) specifications use QoS Class Identifier of 5QI to ensure different types of traffic are allocated appropriate QoS parameters (QCI 1-7 or 5QI). Additionally, mapping DSCP tags to 3GPP QCI and 5QI may also be used for packet classification. Furthermore, packet tagging done at the application layer based on DSCP values is also used similarly by the TX power controller 107 in connection with WWAN communications.

As discussed hereinabove, transmit power for Wi-Fi and WWAN communications has to meet SAR regulatory requirements such that it does not exceed the permissible threshold. The SAR requirements are typically specified by a SAR power level per kilogram taken over the volume containing a mass of 1 gram of tissue. The average output power should be below a certain threshold. Some conventional low-cost solutions include keeping the transmit power always below the threshold irrespective of whether or not there is any human body in proximity to the device. Though this method meets SAR requirements, there is an additional opportunity cost as the device will not be able to transmit at higher power when there is no human close by, resulting in reduced uplink transmission quality efficiency. In other conventional aspects, if human body sensors are present, then the transmit power can be dynamically adjusted based on the detection of the human body close to the transmit antenna. In addition to the above-mentioned techniques, there are intermediate solutions as time averaging SAR (TAS) where the same outcome is achieved without sensors. In this case, the transmit power is varied in such a way that the overall average transmit power is below the SAR threshold. In this way, the device meets the SAR requirements and in some cases, gets the benefit of higher transmit power for some packets.

Figure 5:
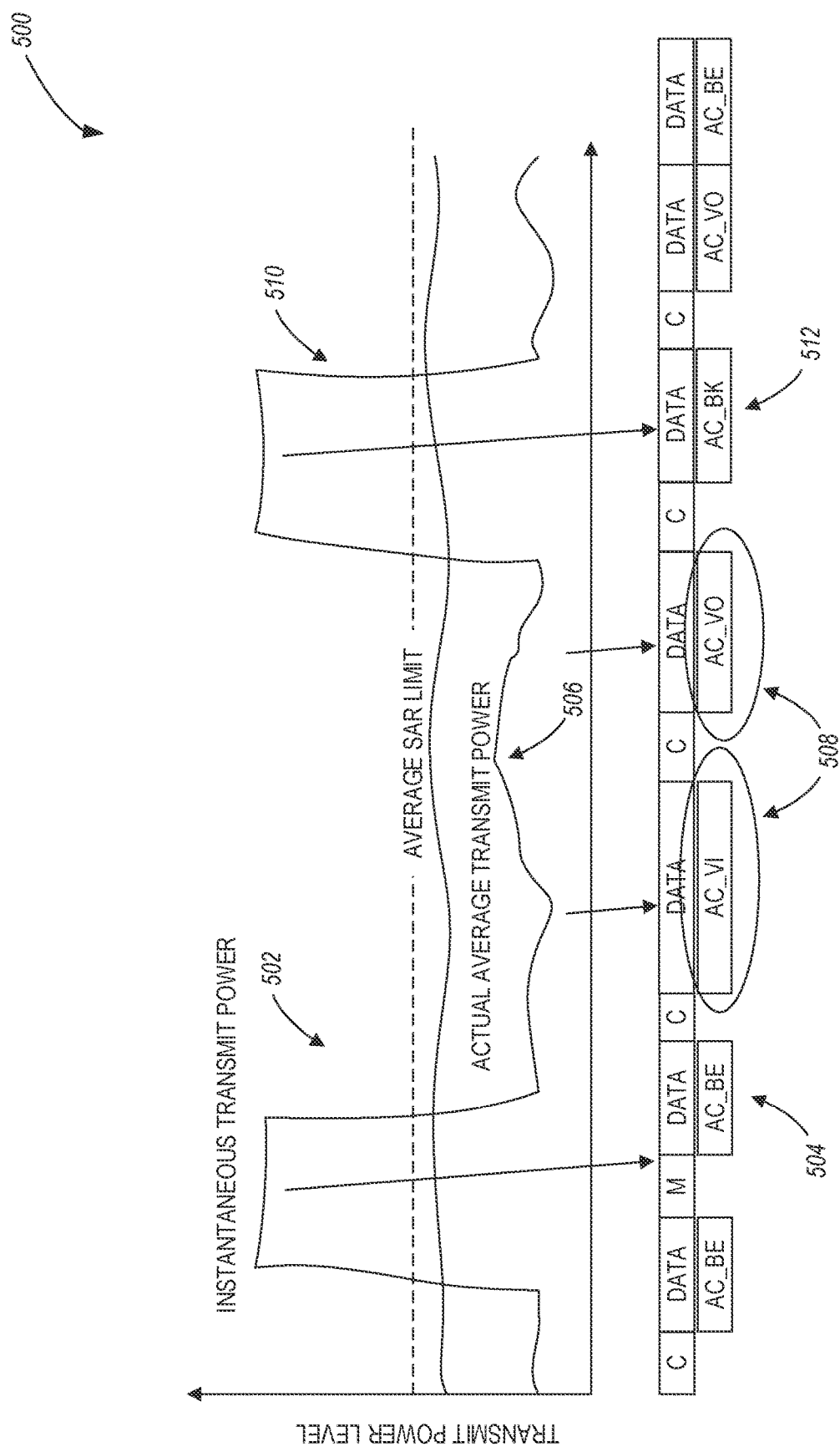
FIG. 5 illustrates a timeline graph of transmit power used for transmission of wireless local area network (WLAN) packets.

The above solutions, however, are not effective enough, particularly in cases where the device is far from the access point, the base station, or is in high channel noise conditions. Using conventional techniques (e.g., as illustrated in FIG. 5), the packets with different priorities are handled the same manner with regard to the RF transmit power, while ensuring SAR compliance is met. As a result, there will be many high-priority packets getting transmitted at lower power compared to low priority packets, which is inefficient.

FIG. 5 illustrates a timeline graph 500 of transmit power used for transmission of WLAN packets. Referring to FIG. 5, graph 500 illustrates aspects when TAS is implemented and for the average power to be below the threshold, the transmit power is chosen based on the specific packet's transmit timing. More specifically, high priority voice or video (AC_VI and AC_VO) packets 508 have low transmission power 506 compared to the low priority background packets 512 or best-effort packets 504 (AC_BE or AC_BK) which have corresponding high transmission powers 510 and 502. This type of transmit power control can impact user experience when high-priority packets incur losses due to lower transmit power and need retransmissions.

Figure 6:
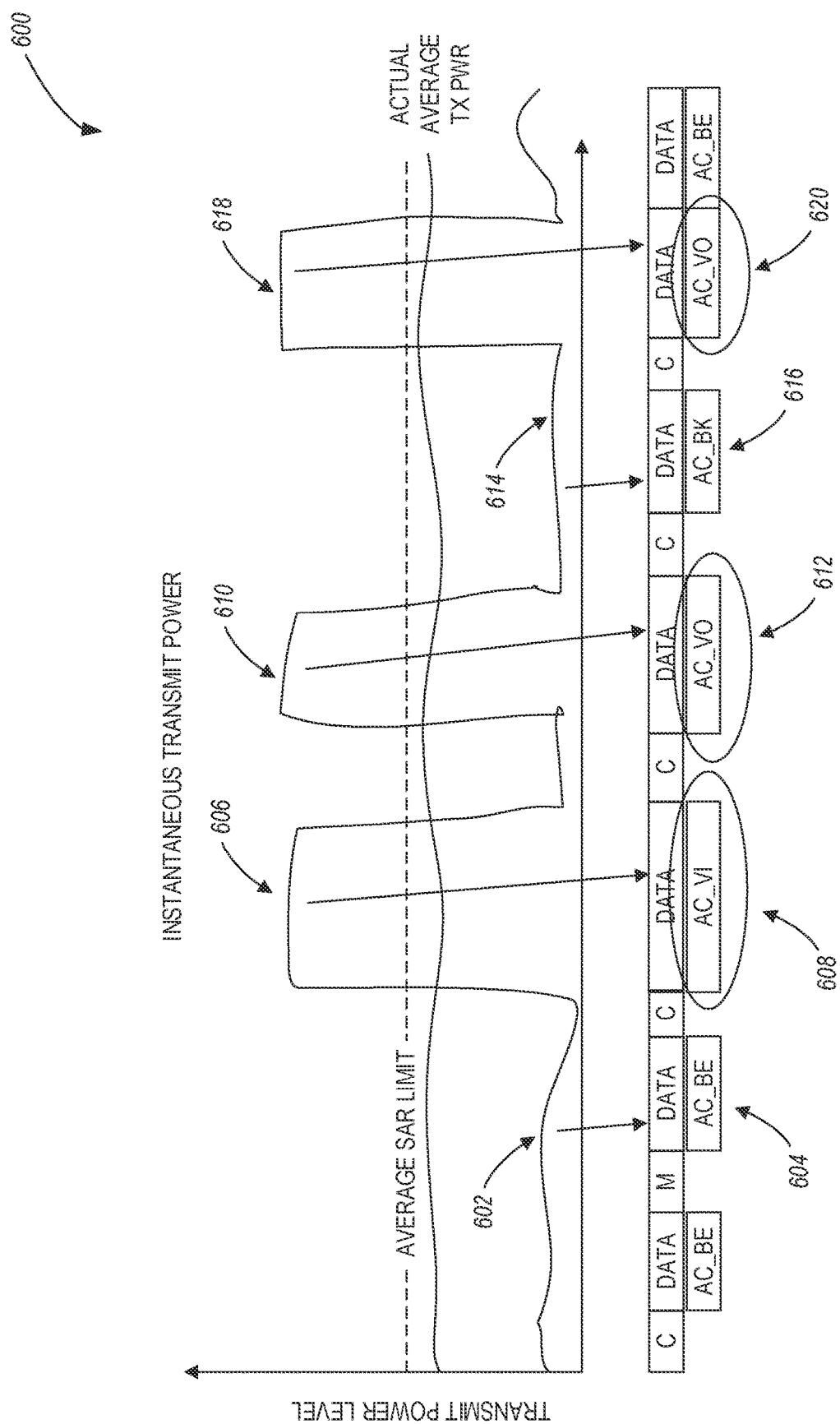
FIG. 6 illustrates a timeline graph of transmit power used for transmission of WLAN packets, where the transmit power is set based on packet priority, in accordance with some embodiments.

In some embodiments, the TX power controller 107 performs the disclosed techniques to transmit high priority packets (like VI or VO access category packets) at high power compared to lower priority packets (e.g., as illustrated in FIG. 6), ensuring the average TX power is maintained below the average SAR limit for SAR compliance.

The disclosed techniques performed by the TX power controller 107 can be categorized into three parts:
  (a) Choice of key parameters and factors for packet priority classification. In some aspects, the TX power controller 107 uses priority information within the packet header (e.g., as explained hereinabove) to classify packets, and select the high priority packets that need to be transmitted to ensure no packet loss or minimize retransmissions.
  (b) Techniques for high priority packet transmit power maximization. More specifically, the TX power controller 107 maximizes high priority packets transmitted at optimal power levels while taking into account SAR compliance aspects (e.g., as discussed in connection with FIGS. 8-11). This can be based on packet type classification based on priority and energy budget available based on SAR compliance targets.

(c) Techniques for conditioning packet transfer times based on the energy budget. For example, the TX power controller 107 is configured to condition the back-off times for different frame types (e.g., control or management frames) or acknowledgment frame transmissions such that the TAS energy budget can be spread in the time domain to enable higher priority packets to get the higher transmit power shared in time.

As illustrated in FIG. 6, the TX power controller 107 uses priority information (e.g., DSCP tag, TOS, Retry Packet (retransmit), other priority information) and informs the layer 1 (L1) firmware which then sets the transmit power level accordingly, while accommodating the fact that the average transmission power is below the average SAR limit.

FIG. 6 illustrates a timeline graph 600 of transmit power used for transmission of WLAN packets, where the transmit power is set based on packet priority, in accordance with some embodiments. Referring to FIG. 6, graph 600 illustrates aspects when TAS energy budget is implemented and for the average power to be below the threshold, the transmit power is chosen based on the specific packet's priority category. More specifically, high priority voice or video (AC_VI and AC_VO) packets (608, 612, and 620) have high transmission power (e.g., 606, 610, and 618 respectively), compared to the low priority background packets 616 or best-effort packets 604 (AC_BE or AC_BK) which have corresponding low transmission powers 614 and 602. This type of transmit power control improves the user experience since the high-priority packets are transmitted at a higher transmission power, with incurring losses due to retransmissions. This transmission power-related processing results in more efficient usage of the RF transmit power and increases the probability of successful transmission of high priority packets. Specifically, in example WLAN communications (when a shared medium is used), carrier sense multiple access with collision avoidance (CSMA/CA) is used (supported by request to send (RTS)/clear to send (CTS)), packet blocks transmission is scheduled to avoid collisions. This time scheduling factor can also be taken into consideration in the disclosed adaptive transmit power scheduling techniques while selecting the appropriate transmit power level (meeting SAR compliance) for each of the different priority packets.

Example Architecture

The overall architecture and transmit power scheduling techniques are further discussed hereinbelow using WLAN as an example (the same techniques apply to WWAN as well).

Figure 7:
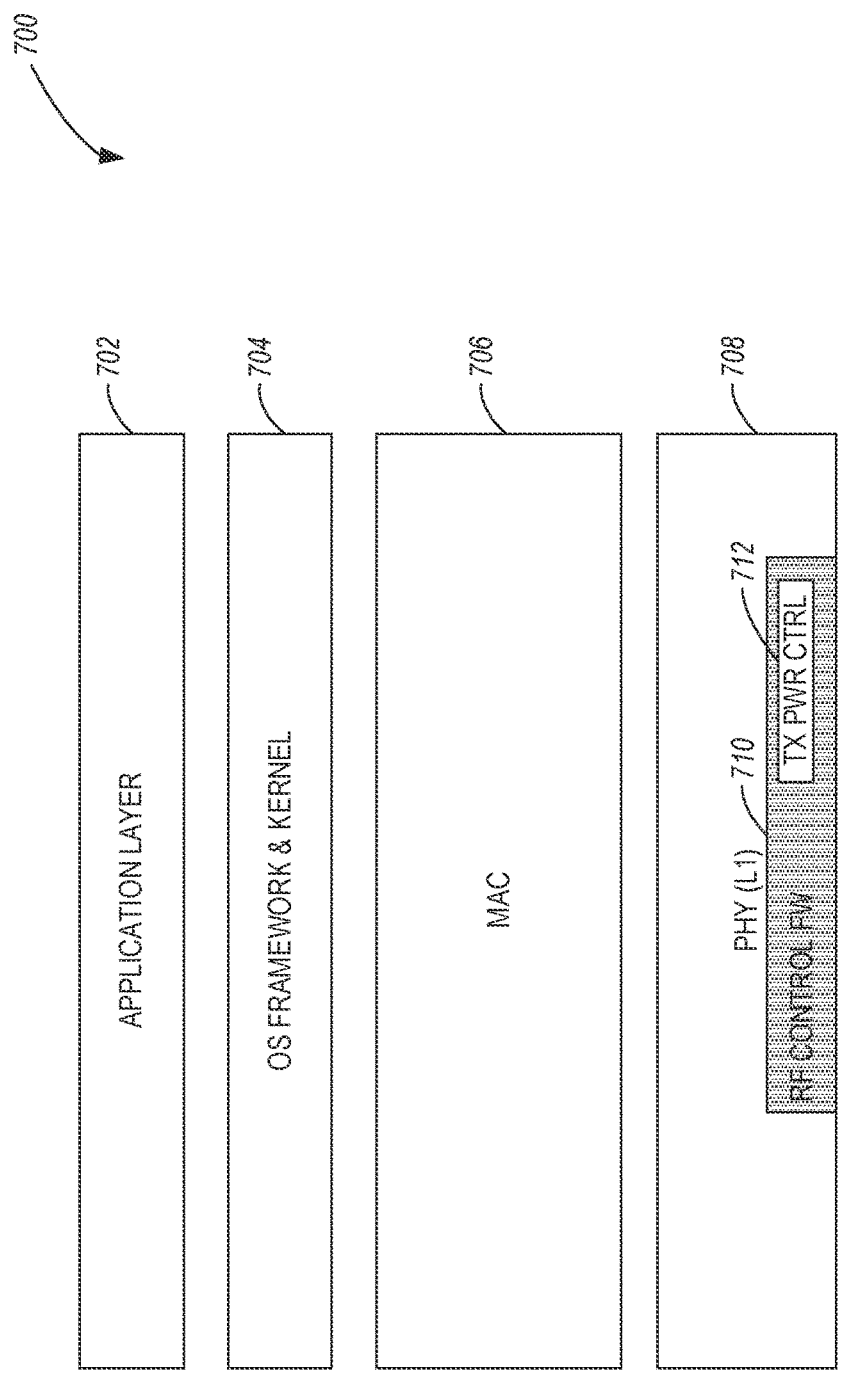
FIG. 7 illustrates an example WLAN firmware stack, in accordance with some embodiments.

The overall packet flow from the application layer to the Wi-Fi Layer 1 (L1) is illustrated in FIG. 7. FIG. 7 illustrates an example of WLAN firmware stack 700, in accordance with some embodiments. More specifically, the WLAN firmware stack 700 includes an application layer 702, operating system framework and kernel layer 704, a media access control (MAC) layer 706, and a physical (PHY or L1) layer 708. The L1 layer 708 includes RF control firmware 710 with a TX power controller 712, which can be the same as TX power controller 107 discussed herein.

In some aspects, the application layer 702 tags the packet (e.g., with priority information including DSCP, TOS, Retry Packet (retransmit), or other priority designation) in the IP header. The Wi-Fi driver adds the WLAN header depending on whether it is a control or data or management frame.

Figure 8:
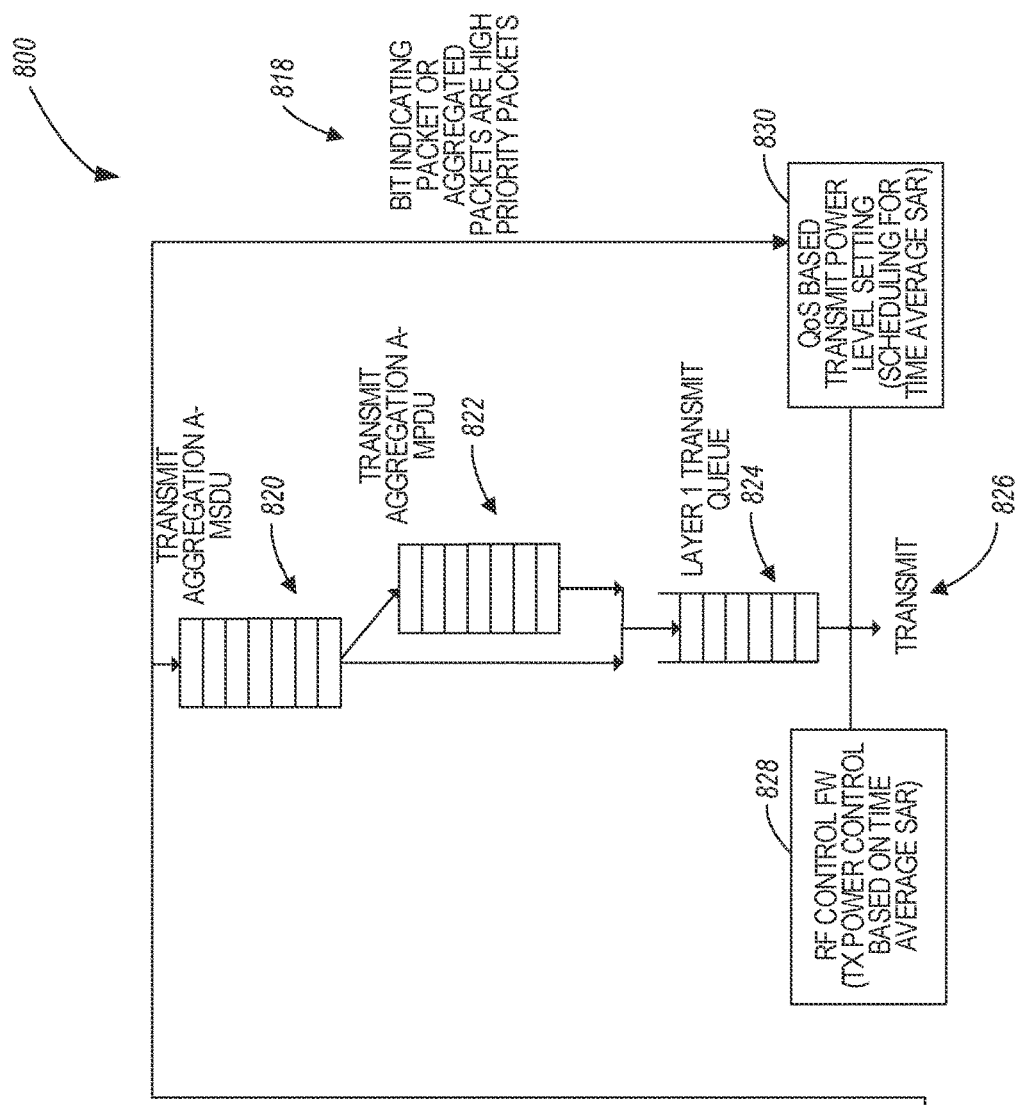
FIG. 8 illustrates transmit power level setting for time average SAR using packet classification based on access categories, in accordance with some embodiments.
Figure 8:
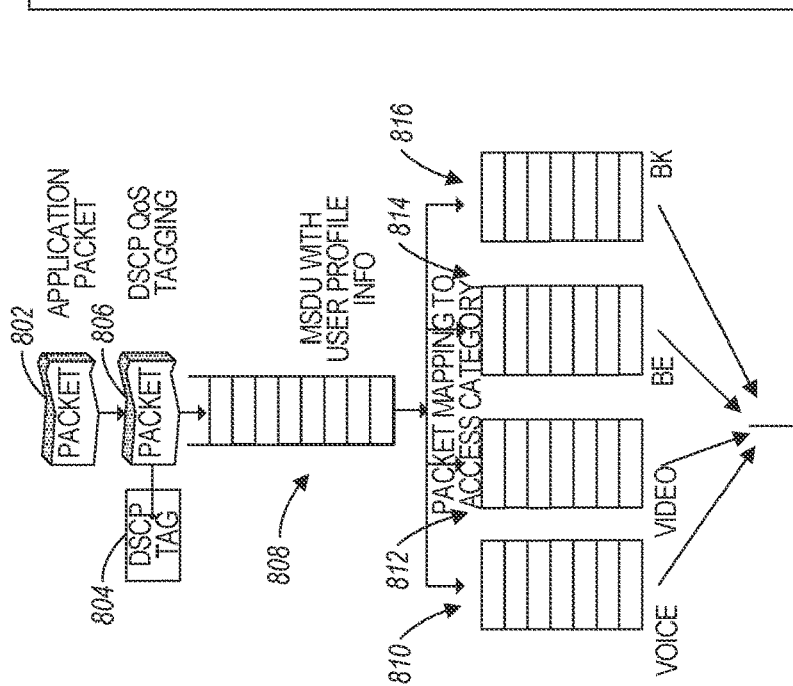

The Wi-Fi firmware (in the MAC and L1 layers) takes care of packet categorization based on DSCP into different traffic flows, which may be mapped to different queues (e.g., as illustrated in FIG. 8). The PHY layer 708 prioritizes the packets from the higher priority queues and transmits them. In some aspects, the RF control firmware 710 sets the transmit power without considering the type of packet. More specifically, the RF control firmware 710 calculates the allowed transmit power for that packet based on the running average transmit power.

In some embodiments (e.g., as illustrated in FIG. 8), the disclosed techniques may be used to extract the packet type information and forward the corresponding packet priority information also to the RF control firmware.

FIG. 8 illustrates diagram 800 of transmit power level setting for time average SAR using packet classification based on access categories, in accordance with some embodiments. Diagram 800 illustrates the data flow path of packet 802 from the application layer to the RF control firmware. Previous solutions do not take into account the packet type while setting transmit power level. In comparison, the disclosed TX power level setting functions use an indicator (e.g., a bit) to indicate the priority of a packet (or aggregated packets) as high or low. Even though a single bit is used as a binary indicator, the disclosure is not limited in this regard and multiple bits may be used as an indicator of different power levels for different priority categories of packets.

Referring to FIG. 8, the TX power setting functionalities of the TX power controller 107 leverage the existing packet classification implementation based on DSCP tags (including other priority information such as TOS) as well as priority information such as packet type (e.g., Retry Packet (retransmit), Control, Data, or Management Frames). Accordingly, a flag is set indicating to the RF L1 layer firmware if the packet is a high priority packet or not.

More specifically, packet 802 is tagged with priority information such as DSCP tag 804 to obtain tagged packet 806 stored in MSDU queue 808. Tagged packets in queue 808 are mapped into corresponding queues 810, 812, 814, and 816, based on the priority information (e.g., indicating different access categories such as voice, video, best effort, or background). An indicator (e.g., a bit) 818 is associated with the priority information of each packet, indicating whether the packet is a high priority packet or a low priority packet based on a pre-configured policy. For example, voice and video packets are considered high priority, and background as best-effort packets are considered low priority. The indicator 818 is communicated to the TX power controller 107 and used during the QoS-based transmit power level setting functions 830 together with the RF control firmware 828 to set transmission power for each packet stored in the transmit aggregation queues 820, 822, and 824 based on the priority category of the packet, before packet transmission at operation 826. An example WLAN firmware stack modified based on the disclosed techniques is illustrated in FIG. 9.

Figure 9:
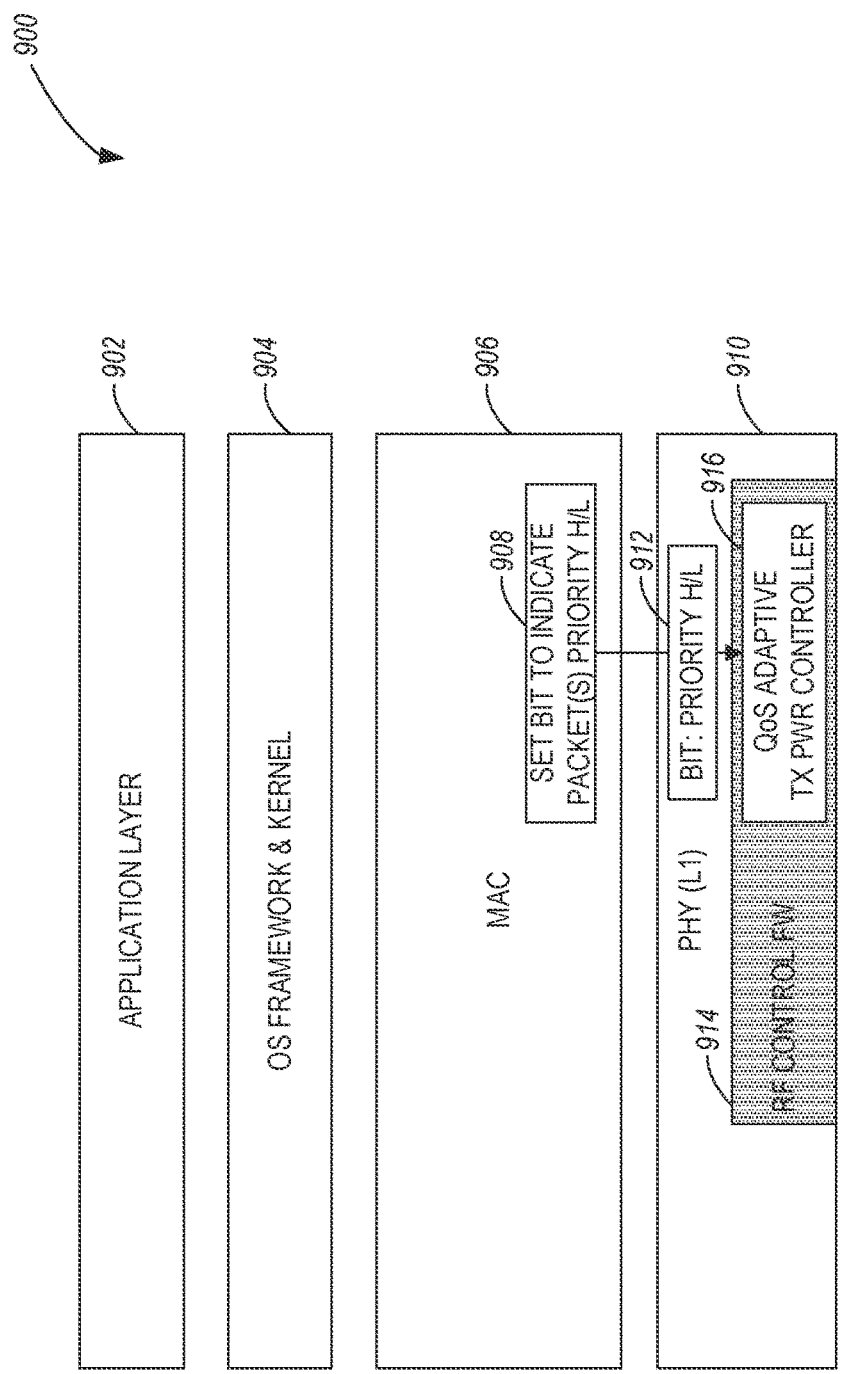
FIG. 9 illustrates another example of a WLAN firmware stack using the disclosed transmit power controller, in accordance with some embodiments.

FIG. 9 illustrates another example of a WLAN firmware stack 900 using the disclosed transmit power controller, in accordance with some embodiments. Referring to FIG. 9, the WLAN firmware stack 900 includes an application layer 902, operating system framework and kernel 904, a MAC layer 906, and L1 layer 910. In some aspects, functionality associated with the MEC layer 906 is used to perform operation 908 set the indicator 818 or 912 (e.g., a bit) to indicate the packet priority category (e.g., high or low). Indicator 912 is then communicated to the TX power controller 916 (which can be the same as TX power controller 107) within the RF control firmware 914 to perform the TX power setting functionalities discussed herein.

TX Power Setting Functionalities

In some embodiments, the TX power setting functionalities performed by the TX power controller 107 may include functionalities performed in three stages as follows: (a) Stage 1—identifying high priority packets at the MAC layer; Stage 2—usage of control bit for adaptive transmit power control (e.g., tagging high priority packets to indicate priority in transmission power); and Stage 3—QoS-based adaptive transmit power scheduling (e.g., using TAS energy budget within SAR limits to set transmit power of high priority packets or reschedule packet transmission) (if configurable, e.g., in WLAN back-off time to improve chances of best transmit power for high priority packets).

Stage 1—Identifying Priority Packets and Indicating to RF Control Firmware

In some embodiments, the MAC layer performs a first level of packet classification to identify if the packet is eligible to be transmitted at high power or not. For example, the TX power controller can use the following techniques:
 (a) Using existing user priority traffic flow-based categorization already implemented as per 802.11e specification. For example, for Voice and Video Access Category packets, an indicator such as the HIGH_TRANSMIT_POWER_EN bit is set to 1. This can be also done based on a reading of which queue the packet is to be transmitted from next. In aspects when aggregation is used, either MSDU or MPDU case, the same rule applies as all the packets aggregated will be from the same queue.
 (b) Based on TOS or any other standardized or proprietary field in the packet header, the HIGH_TRANSMIT_POWER_EN bit can be set to 1 or 0 based on the priority.
 (c) Based on WLAN packet type, the TX power controller may set the HIGH_TRANSMIT_POWER_EN bit to 1 or 0 (e.g., control packets may be considered to always have high priority).

Figure 10:
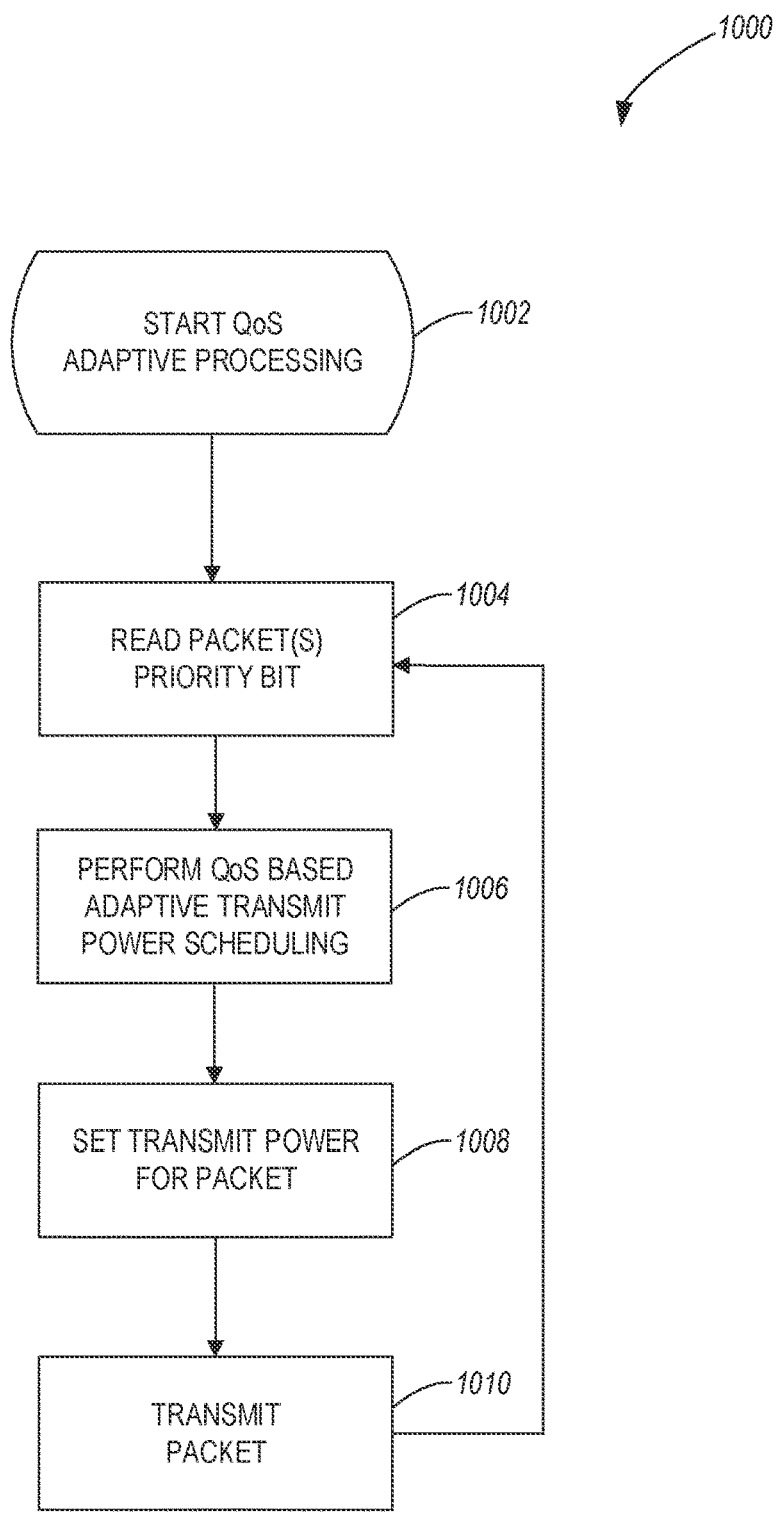
FIG. 10 illustrates a flow diagram of a method for using quality of service (QoS) based adaptive transmit power scheduling for setting transmission power of a packet, in accordance with some embodiments.
Figure 11:
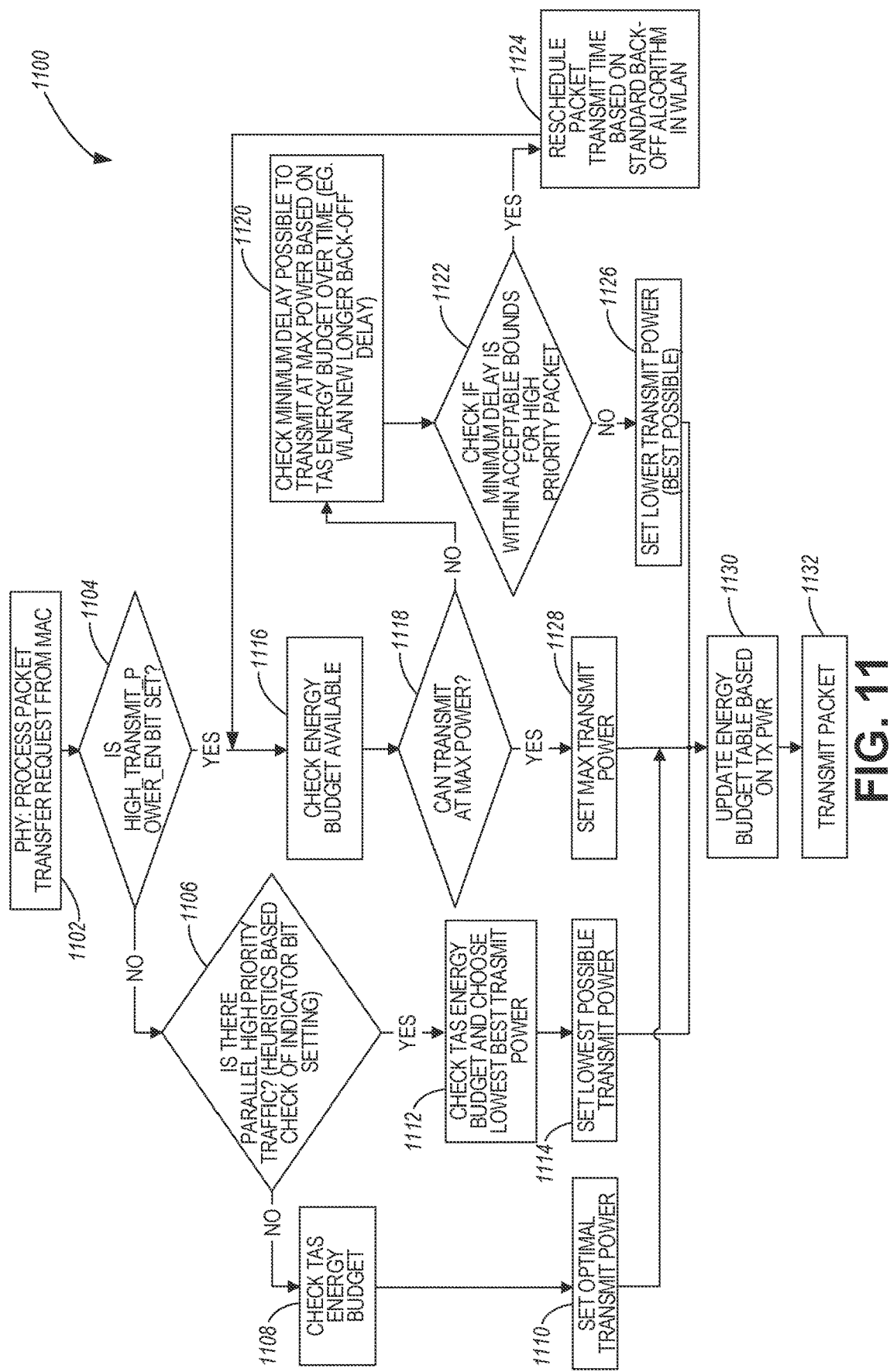
FIG. 11 illustrates a more detailed flow diagram of the QoS based adaptive transmit power scheduling of FIG. 10, in accordance with some embodiments.

In some embodiments, the HIGH_TRANSMIT_POWER_EN bit is passed to the RF control firmware block along with the packet where the QoS adaptive transmit power controller (e.g., TX power controller 107) uses it in its Stage 2 functions (e.g., as further illustrated in FIG. 10 and FIG. 11).

Stage 2—Usage of Control Bit for Adaptive Transmit Power Control

FIG. 10 illustrates a flow diagram of a method 1000 for using quality of service (QoS) based adaptive transmit power scheduling for setting transmission power of a packet, in accordance with some embodiments. At operation 1002, the TX power controller starts the QoS adaptive processing. At operation 1004, the HIGH_TRANSMIT_POWER_EN bit is read by the TX power controller. At operation 1006, the TX power controller performs QoS-based adaptive transmit power scheduling. More specifically, if the indicator bit is set to 1, the single or aggregate SDU is eligible to be transmitted at high power. The decision of whether the packet is eventually transmitted at high power or not may be based on the QoS adaptive transmit power scheduling (described in greater detail in connection with Stage 3 and FIG. 11). At operation 1008, the TX power controller sets the transmit power for the packet based on the transmit power scheduling. At operation 1010, the packet is transmitted using the set transmission power.

In some embodiments, each of two or more bits are used as the indicator, the transmit power level for the different priority packets can be mapped accordingly.

Stage 3—QoS-Based Adaptive Transmit Power Scheduling

FIG. 11 illustrates a more detailed flow diagram of method 1100 of the QoS-based adaptive transmission power scheduling from FIG. 10, in accordance with some embodiments.

In some aspects, packet transmission in uplink varies depending on the type of physical layer (e.g., in WLAN, it is primarily based on CSMA/CA, and in WWAN it depends on the bearer type such as LTE, GSM/GPRS, etc.).

The QoS-based adaptive transmit power scheduling method (e.g., as illustrated in FIG. 11) which decides the final transmit power for each packet takes into consideration three factors:
 (a) The indicator bit (e.g., the HIGH_TRANSMIT_POWER_EN bit) setting for the packet under consideration for transmission.
 (b) The running average transmit power level and its delta from the permissible average transmit power threshold as per SAR compliance to check if high priority can be transmitted at maximum power (e.g., based on power budget shaping and allocation techniques). In cases of low priority packets, the transmit power may be reduced below a fixed SAR table value, to maintain an extra energy budget for future high priority packets.
 (c) In aspects when the TAS energy budget does not permit transmitting a high priority packet at maximum power, the next minimum back-off delay that is possible is checked, where the energy budget allows maximum power to transmit. Based on delay within acceptable latency limit, the transmit high priority packet immediately at lower power or delayed with maximum power.

At operation 1102, processing of a packet transfer request from the MAC layer is performed at the PHY layer. At 1104, a determination is made on whether the indicator bit (e.g., the HIGH_TRANSMIT_POWER_EN bit) is set. If the indicator bit is not set, at operation 1106, a determination is made on whether there is parallel high priority traffic being processed by the wireless device. For example, a heuristics-based check of the indicator bit setting is performed. If there is no high priority traffic, at operation 1108, the TAS energy budget is checked. At operation 1110, the optimal transmit power is set. Processing then continues at operation 1130 when the energy budget table is updated based on the TX power. At operation 1132, the packet is transmitted at the set transmission power.

If there is high priority traffic, at operation 1112, the TAS energy budget is checked and the lowest transmit power is selected which is permissible under the TAS energy budget. At operation 1114, the lowest permissible transmit power is set and processing continues to operations 1130 and 1132.

If the indicator bit is set, at operation 1116, the available TAS energy budget is checked. At operation 1118, a determination is made on whether the device can transmit at the maximum allowed power based on the checked TAS energy budget. If the device can transmit at the maximum allowed power, at operation 1128, the transmit power is set to the maximum allowed power, and processing continues at operations 1130 and 1132. If the device cannot transmit at the maximum allowed power, at operation 1120, the TX power control rejects a minimum delay that is possible for transmitting at the maximum allowed power based on the TAS energy budget (e.g., WLAN new longer backoff delay). At operation 1122, a determination is made on whether the minimum delay is within acceptable bounds for a high priority packet. If it is within the acceptable bounds, at operation 1124, the packet transmission time is rescheduled based on the standard backoff algorithm in WLAN processing continues at operation 1116. If it is not within acceptable bounds, at operation 1126, lower transmission power is set and processing continues at operations 1130 and 1132.

The basis of the QoS-based adaptive transmit power scheduling can be any TAS algorithm where the transmit power of a packet is decided based on the running average transmit power. This algorithm may be modified where the scheduling of high or low transmit power level for a specific packet, in this case, must now take into consideration the indicator bit (e.g., the HIGH_TRANSMIT_POWER_EN bit). If the indicator bit is zero, the algorithm may set the power low. In some aspects, this power budget algorithm can also reduce transmit power for low priority packets below the TAS energy limit to reserve and maintain an extra energy budget for future high priority packets.

In some embodiments, a dual watermark based solution can be adopted where, if a majority of packets were transmitted at low power in the previous averaging window, then, priority inversion can be done to enable some low priority packets to obtain the advantage of higher transmit power, as long as it is below a second threshold level (which may be optional). The second threshold may be added to ensure the following high-priority packets do not get starved of being able to send at high power at a later time. On the other hand, if transmission back-off timer value is available (e.g., in WLAN), it can also be taken into consideration when deciding the transmit power for current and future high priority packets, as power time power calculation includes idle waiting time too, thus lowering the average power.

If the indicator bit (e.g., the HIGH_TRANSMIT_POWER_EN bit) is set to 1, then the algorithm can choose whether to transmit at high power or not. The TX power controller 107 may consider the running average of transmit power, the allowed leeway to transmit at high power within the SAR threshold, and can also consider other factors (e.g., giving higher priority for packets which are getting retransmitted compared to others, in cases where there are many packets with the eligibility set to 1). In this regard, the algorithm ensures that high-priority packets also get due priority to be transmitted at higher power while also meeting SAR compliance.

Figure 12:
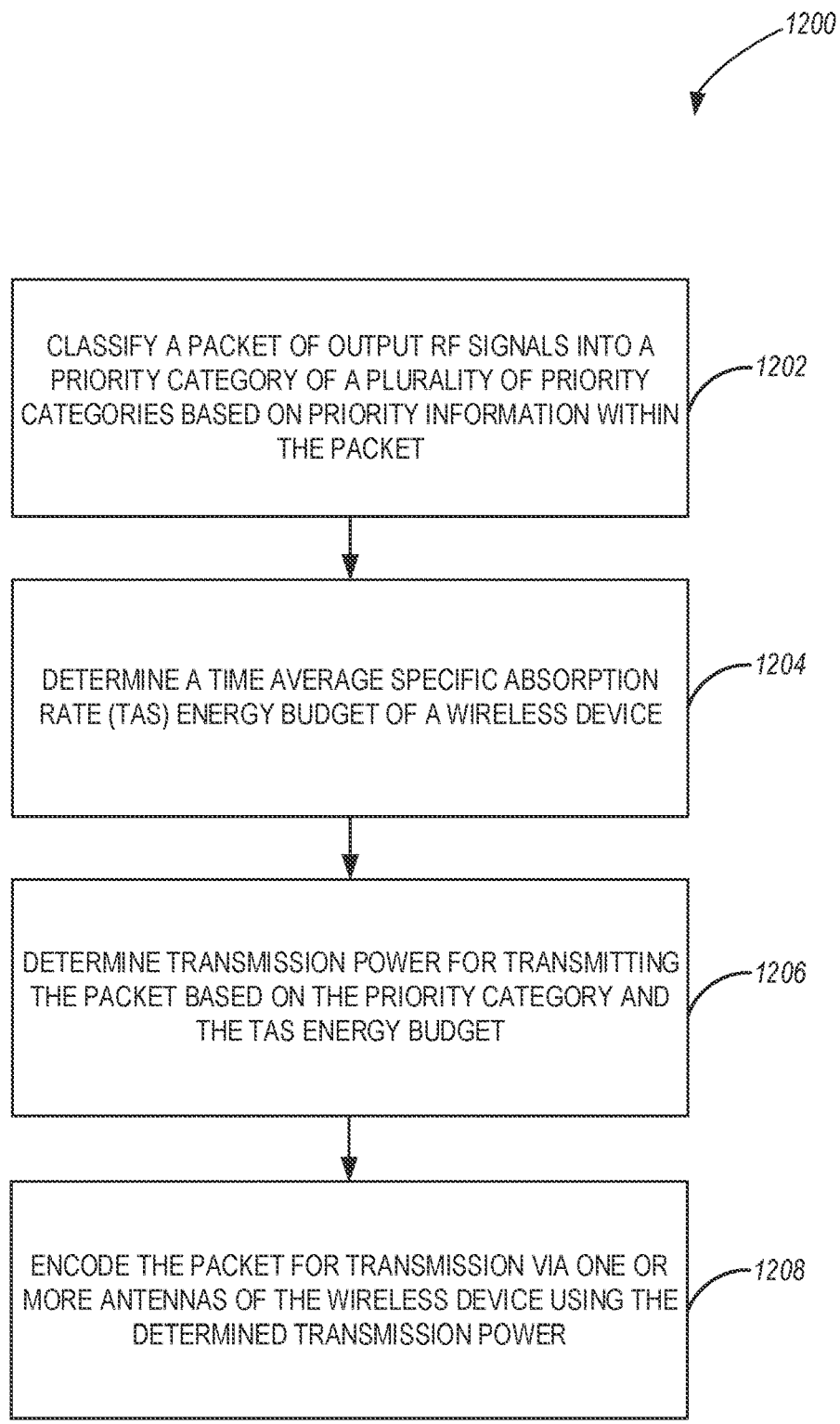
FIG. 12 illustrates a flow diagram of a method for controlling transmission power, in accordance with some embodiments.

FIG. 12 illustrates a flow diagram of a method 1200 for controlling transmission power, in accordance with some embodiments. Referring to FIG. 12, method 1200 includes operations 1202, 1204, 1206, and 1208, which may be executed by the TX power controller 107 or another controller of a wireless device (e.g., hardware processor 1302 of machine 1300 illustrated in FIG. 13).

The wireless device may include one or more antennas (e.g., one or more antennas 101) coupled to a transmit chain (e.g., transmit chain 105). The transmit chain is configured to generate output RF signals using baseband signals. The transmit chain includes a transmit power controller configured to, at operation 1202, classify a packet of the output RF signals into a priority category of a plurality of priority categories based on priority information within the packet. Alternatively, the TX power controller obtains or receives an indicator (e.g., an indicator bit) from the MAC layer (or another layer), with the indicator bit indicating the priority category (e.g., 1 for high and 0 for low). At operation 1204, the TX power controller determines a time average specific absorption rate (TAS) energy budget of the wireless device. In some embodiments, the TAS energy budget is based on a pre-configured regulatory power limit (e.g., a SAR transmit power limit) of the wireless device over a time interval.

At operation 1206, the TX power controller determines transmission power for transmitting the packet based on the priority category and the TAS energy budget. At operation 1208, the packet is encoded for transmission via the one or more antennas using the determined transmission power.

In some aspects, the priority information includes a differential services code point (DSCP) tag within a header of the packet, a type of service (TOS) header or field associated with the packet, aggregation control information associated with the packet, or wireless frame type information (e.g., the wireless frame type information indicating the packet is associated with one of a management frame type, a control type, or a data type).

In some embodiments, the TX power controller is configured to access a plurality of inspection rules or policies using at least one application programming interface (API), and determine the priority category based on inspection of the packet using the inspection rules or policies.

In some embodiments, the plurality of priority categories includes at least a low priority packet category and a high priority packet category. In some embodiments, when the packet is classified under the low priority packet category, the TX power controller is configured to determine whether parallel traffic of additional packets is present in the transmit chain. The additional packets are classified under the high priority packet category. In some embodiments, when the parallel traffic of additional packets is present in the transmit chain, the TX power controller is configured to set the transmission power for transmitting the packet to the lowest transmission power within the TAS energy budget.

In some embodiments, when the parallel traffic of additional packets is not present in the transmit chain, the TX power controller is configured to set the transmission power for transmitting the packet to a transmission power that is between the lowest transmission power within the TAS energy budget and maximum transmission power of the wireless device. In some embodiments, when the packet is classified under the high priority packet category, the TX power controller is configured to determine whether the maximum transmission power of the wireless device is within the TAS energy budget.

In some embodiments, when the maximum transmission power of the wireless device is within the TAS energy budget, the TX power controller is configured to set the transmission power for transmitting the packet to the maximum transmission power of the wireless device.

In some embodiments, when the maximum transmission power of the wireless device is not within the TAS energy budget, the TX power controller is configured to select a delay interval, the delay interval being within a delay threshold associated with the high priority packet category. The TX power controller is further configured to determine whether the maximum transmission power of the wireless device is within the TAS energy budget after the delay interval.

In some embodiments, when the maximum transmission power of the wireless device is within the TAS energy budget after the delay interval, the TX power controller is configured to set the transmission power for transmitting the packet to the maximum transmission power of the wireless device. In some embodiments, when the maximum transmission power of the wireless device is not within the TAS energy budget after the delay interval, the TX power controller is configured to set the transmission power for transmitting the packet to a transmission power that is lower than the maximum transmission power of the wireless device and is within the TAS energy budget.

Figure 13:
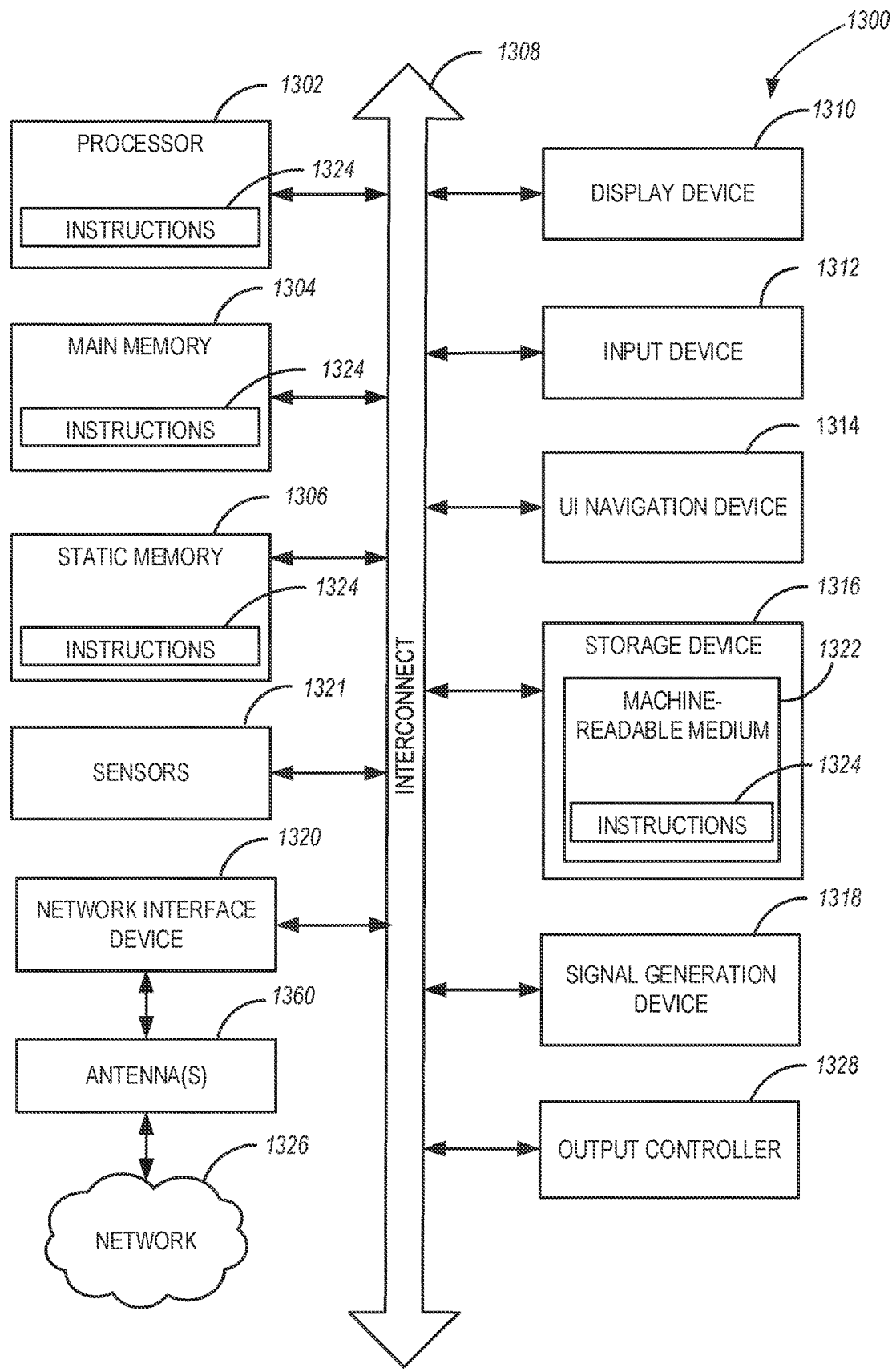
FIG. 13 illustrates a block diagram of an example machine upon which any one or more of the operations/techniques (e.g., methodologies) discussed herein may perform.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, machine 1300 may operate in the capacity of a server machine, a client machine, or both in server-client network environments. In an example, the machine 1300 may act as a peer machine in a peer-to-peer (P2P) (or other distributed) network environment. The machine 1300 may be a personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1300 may include a hardware processor 1302 (e.g., a central processing unit (CPU), a graphics processing unit (GPU), a hardware processor core, or any combination thereof), a main memory 1304, and a static memory 1306, some or all of which may communicate with each other via an interlink (e.g., bus) 1308.

Specific examples of main memory 1304 include Random Access Memory (RAM), and semiconductor memory devices, which may include, in some embodiments, storage locations in semiconductors such as registers. Specific examples of static memory 1306 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

Machine 1300 may further include a display device 1310, an input device 1312 (e.g., a keyboard), and a user interface (UI) navigation device 1314 (e.g., a mouse). In an example, the display device 1310, input device 1312, and UI navigation device 1314 may be a touch screen display. The machine 1300 may additionally include a storage device (e.g., drive unit or another mass storage device) 1316, a signal generation device 1318 (e.g., a speaker), a network interface device 1320, and one or more sensors 1321, such as a global positioning system (GPS) sensor, compass, accelerometer, or other sensors. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 1302 and/or instructions 1324 may comprise processing circuitry and/or transceiver circuitry.

The storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 1322 is illustrated as a single medium, the term "machine-readable medium" may include a single medium or multiple media (e.g., a centralized or distributed database, and/or associated caches and servers) configured to store one or more instructions 1324.

An apparatus of the machine 1300 may be one or more of a hardware processor 1302 (e.g., a central processing unit (CPU), a graphics processing unit (GPU), a hardware processor core, or any combination thereof), a main memory 1304 and a static memory 1306, one or more sensors 1321, a network interface device 1320, antennas 1360, a display device 1310, an input device 1312, a UI navigation device 1314, a storage device 1316, instructions 1324, a signal generation device 1318, and an output controller 1328. The apparatus may be configured to perform one or more of the methods and/or operations disclosed herein. The apparatus may be intended as a component of the machine 1300 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1320 may include one or more physical jacks (e.g., Ethernet, coaxial, or phone jacks) or one or more antennas to connect to the communications network 1326. In an example, the network interface device 1320 may include one or more antennas 1360 to wirelessly communicate using at least one single-input multiple-output (SIMO), multiple-input multiple-output (MIMO), or multiple-input single-output (MISO) techniques. In some examples, the network interface device 1320 may wirelessly communicate using Multiple User MIMO techniques. The term "transmission medium" shall be taken to include any intangible medium that is capable of storing, encoding, or carrying instructions for execution by the machine 1300, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; flash memory, etc.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to 1/10 of a wavelength or more.

ADDITIONAL NOTES AND EXAMPLES

Example 1 is a wireless device comprising: one or more antennas; and a transmit chain coupled to the one or more antennas, the transmit chain configured to generate output radio frequency (RF) signals using baseband signals, the transmit chain comprising a transmit power controller, the transmit power controller configured to classify a packet of the output RF signals into a priority category of a plurality of priority categories based on priority information within the packet; determine a time average specific absorption rate (TAS) energy budget of the wireless device, the TAS energy budget based on a pre-configured regulatory power limit of the wireless device over a time interval; determine transmission power for transmitting the packet based on the priority category and the TAS energy budget; and encode the packet for transmission via the one or more antennas using the determined transmission power.

In Example 2, the subject matter of Example 1 includes, wherein the priority information includes a differential services code point (DSCP) tag within a header of the packet.

In Example 3, the subject matter of Examples 1-2 includes, wherein the priority information includes a type of service (TOS) header or field associated with the packet.

In Example 4, the subject matter of Examples 1-3 includes, wherein the priority information includes aggregation control information associated with the packet.

In Example 5, the subject matter of Examples 1-4 includes, wherein the priority information is: a wireless frame type information, the wireless frame type information indicating the packet is associated with one of: a management frame type, a control type, or a data type; or information based on inferring a packet transfer reliability requirement of the packet.

In Example 6, the subject matter of Examples 1-5 includes, wherein the transmit power controller configured to access a plurality of inspection rules or policies using at least one application programming interface (API); and determine the priority category based on inspection of the packet using the inspection rules or policies.

In Example 7, the subject matter of Examples 1-6 includes, wherein the plurality of priority categories comprises at least a low priority packet category and a high priority packet category.

In Example 8, the subject matter of Example 7 includes, wherein when the packet is classified under the low priority packet category, the transmit power controller is configured to determine whether traffic of additional packets is present in the transmit chain, the additional packets classified under the high priority packet category.

In Example 9, the subject matter of Example 8 includes, wherein when the traffic of additional packets is present in the transmit chain, the transmit power controller is configured to set the transmission power for transmitting the packet to a lowest transmission power within the TAS energy budget.

In Example 10, the subject matter of Example 9 includes, wherein when the traffic of additional packets is not present in the transmit chain, the transmit power controller is configured to: set the transmission power for transmitting the packet to a transmission power that is between the lowest transmission power within the TAS energy budget and a maximum transmission power of the wireless device.

In Example 11, the subject matter of Examples 7-10 includes, wherein when the packet is classified under the high priority packet category, the transmit power controller is configured to determine whether a maximum transmission power of the wireless device is within the TAS energy budget.

In Example 12, the subject matter of Example 11 includes, wherein when the maximum transmission power of the wireless device is within the TAS energy budget, the transmit power controller is configured to: set the transmission power for transmitting the packet to the maximum transmission power of the wireless device.

In Example 13, the subject matter of Examples 11-12 includes, wherein when the maximum transmission power of the wireless device is not within the TAS energy budget, the transmit power controller is configured to select a delay interval, the delay interval being within a delay threshold associated with the high priority packet category; and determine whether the maximum transmission power of the wireless device is within the TAS energy budget after the delay interval.

In Example 14, the subject matter of Example 13 includes, wherein when the maximum transmission power of the wireless device is within the TAS energy budget after the delay interval, the transmit power controller is configured to set the transmission power for transmitting the packet to the maximum transmission power of the wireless device.

In Example 15, the subject matter of Example 14 includes, wherein when the maximum transmission power of the wireless device is not within the TAS energy budget after the delay interval, the transmit power controller is configured to set the transmission power for transmitting the packet to a transmission power that is lower than the maximum transmission power of the wireless device and is within the TAS energy budget.

Example 16 is at least one machine-readable storage medium comprising instructions stored thereupon, which when executed by processing circuitry of a wireless device, cause the processing circuitry to perform operations comprising: classifying a packet of output radio frequency (RF) signals into a priority category of a plurality of priority categories based on priority information within the packet, the output RF signals based on baseband signals within a transmit chain of the wireless device; determining a time average specific absorption rate (TAS) energy budget of the wireless device, the TAS energy budget based on a pre-configured regulatory power limit of the wireless device over a time interval; determining transmission power for transmitting the packet based on the priority category and the TAS energy budget; and encoding the packet for transmission via one or more antennas using the determined transmission power.

In Example 17, the subject matter of Example 16 includes, wherein the priority information includes at least one of a differential services code point (DSCP) tag within a header of the packet; a type of service (TOS) header or field associated with the packet; aggregation control information associated with the packet; a wireless frame type information, the wireless frame type information indicating the packet is associated with one of: a management frame type, a control type, or a data type; and information based on inferring a packet transfer reliability requirement of the packet.

In Example 18, the subject matter of Examples 16-17 includes, wherein the processing circuitry is further configured to perform operations comprising: accessing a plurality of inspection rules or policies using at least one application programming interface (API); and determining the priority category based on inspection of the packet using the inspection rules or policies.

In Example 19, the subject matter of Examples 16-18 includes, wherein the plurality of priority categories comprises at least a low priority packet category and a high priority packet category, and wherein when the packet is classified under the low priority packet category, the processing circuitry is further configured to perform operations comprising: determining whether traffic of additional packets is present in the transmit chain, the additional packets classified under the high priority packet category; and setting the transmission power for transmitting the packet to a lowest transmission power within the TAS energy budget when the traffic of additional packets is present in the transmit chain.

Example 20 is a method for controlling transmission power in a wireless device, the method comprising: classifying a packet of output radio frequency (RF) signals into a priority category of a plurality of priority categories based on priority information within the packet, the output RF signals based on baseband signals within a transmit chain of the wireless device; determining a time average specific absorption rate (TAS) energy budget of the wireless device, the TAS energy budget based on a pre-configured regulatory power limit of the wireless device over a time interval; determining transmission power for transmitting the packet based on the priority category and the TAS energy budget; and encoding the packet for transmission via one or more antennas using the determined transmission power.

In Example 21, the subject matter of Example 20 includes, wherein the priority information includes at least one of a differential services code point (DSCP) tag within a header of the packet; a type of service (TOS) header or field associated with the packet; aggregation control information associated with the packet; a wireless frame type information, the wireless frame type information indicating the packet is associated with one of: a management frame type, a control type, or a data type; and information based on inferring a packet transfer reliability requirement of the packet.

In Example 22, the subject matter of Examples 20-21 includes, accessing a plurality of inspection rules or policies using at least one application programming interface (API); and determining the priority category based on inspection of the packet using the inspection rules or policies.

In Example 23, the subject matter of Examples 20-22 includes, wherein the plurality of priority categories comprises at least a low priority packet category and a high priority packet category, and wherein when the packet is classified under the low priority packet category, the method further comprises: determining whether traffic of additional packets is present in the transmit chain, the additional packets classified under the high priority packet category; and setting the transmission power for transmitting the packet to a lowest transmission power within the TAS energy budget when the traffic of additional packets is present in the transmit chain.

Example 24 is at least one machine-readable medium including instructions that, when executed by processing circuitry, cause the processing circuitry to perform operations to implement any of Examples 1-23.

Example 25 is an apparatus comprising means to implement any of Examples 1-23.

Example 26 is a system to implement any of Examples 1-23.

Example 27 is a method to implement any of Examples 1-23.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined regarding the appended claims, along with the full scope of equivalents to which such claims are entitled.

What is claimed is:

1. A wireless device comprising:
   one or more antennas; and
   a transmit chain coupled to the one or more antennas, the transmit chain configured to generate output radio frequency (RF) signals using baseband signals, the transmit chain comprising a transmit power controller, the transmit power controller configured to:
     classify a packet of the output RF signals into a priority category of a plurality of priority categories based on priority information within the packet;
     determine a time average specific absorption rate (TAS) energy budget of the wireless device, the TAS energy budget based on a pre-configured regulatory power limit of the wireless device over a time interval;
     determine transmission power for transmitting the packet based on the priority category and the TAS energy budget; and
     encode the packet for transmission via the one or more antennas using the determined transmission power.

2. The wireless device of claim 1, wherein the priority information includes a differential services code point (DSCP) tag within a header of the packet.

3. The wireless device of claim 1, wherein the priority information includes a type of service (TOS) header or field associated with the packet.

4. The wireless device of claim 1, wherein the priority information includes aggregation control information associated with the packet.

5. The wireless device of claim 1, wherein the priority information is:
   a wireless frame type information, the wireless frame type information indicating the packet is associated with one of: a management frame type, a control type, or a data type; or
   information based on inferring a packet transfer reliability requirement of the packet.

6. The wireless device of claim 1, wherein the transmit power controller is configured to:
   access a plurality of inspection rules or policies using at least one application programming interface (API); and
   determine the priority category based on inspection of the packet using the inspection rules or policies.

7. The wireless device of claim 1, wherein the plurality of priority categories comprises at least a low priority packet category and a high priority packet category.

8. The wireless device of claim 7, wherein when the packet is classified under the low priority packet category, the transmit power controller is configured to:
   determine whether traffic of additional packets is present in the transmit chain, the additional packets classified under the high priority packet category.

9. The wireless device of claim 8, wherein when the traffic of additional packets is present in the transmit chain, the transmit power controller is configured to:
   set the transmission power for transmitting the packet to a lowest transmission power within the TAS energy budget.

10. The wireless device of claim 9, wherein when the traffic of additional packets is not present in the transmit chain, the transmit power controller is configured to:
    set the transmission power for transmitting the packet to a transmission power that is between the lowest transmission power within the TAS energy budget and a maximum transmission power of the wireless device.

11. The wireless device of claim 7, wherein when the packet is classified under the high priority packet category, the transmit power controller is configured to:
    determine whether a maximum transmission power of the wireless device is within the TAS energy budget.

12. The wireless device of claim 11, wherein when the maximum transmission power of the wireless device is within the TAS energy budget, the transmit power controller is configured to:
    set the transmission power for transmitting the packet to the maximum transmission power of the wireless device.

13. The wireless device of claim 11, wherein when the maximum transmission power of the wireless device is not within the TAS energy budget, the transmit power controller is configured to:
    select a delay interval, the delay interval being within a delay threshold associated with the high priority packet category; and
    determine whether the maximum transmission power of the wireless device is within the TAS energy budget after the delay interval.

14. The wireless device of claim 13, wherein when the maximum transmission power of the wireless device is within the TAS energy budget after the delay interval, the transmit power controller is configured to:
    set the transmission power for transmitting the packet to the maximum transmission power of the wireless device.

15. The wireless device of claim 14, wherein when the maximum transmission power of the wireless device is not within the TAS energy budget after the delay interval, the transmit power controller is configured to:
    set the transmission power for transmitting the packet to a transmission power that is lower than the maximum transmission power of the wireless device and is within the TAS energy budget.

16. At least one non-transitory machine-readable storage medium comprising instructions stored thereupon, which when executed by processing circuitry of a wireless device, cause the processing circuitry to perform operations comprising:
    classifying a packet of output radio frequency (RF) signals into a priority category of a plurality of priority categories based on priority information within the packet, the output RF signals based on baseband signals within a transmit chain of the wireless device;
    determining a time average specific absorption rate (TAS) energy budget of the wireless device, the TAS energy budget based on a pre-configured regulatory power limit of the wireless device over a time interval;
    determining transmission power for transmitting the packet based on the priority category and the TAS energy budget; and
    encoding the packet for transmission via one or more antennas using the determined transmission power.

17. The at least one non-transitory machine-readable storage medium of claim 16, wherein the priority information includes at least one of:
    a differential services code point (DSCP) tag within a header of the packet;
    a type of service (TOS) header or field associated with the packet;
    aggregation control information associated with the packet;
    a wireless frame type information, the wireless frame type information indicating the packet is associated with one of: a management frame type, a control type, or a data type; and
    information based on inferring a packet transfer reliability requirement of the packet.

18. The at least one non-transitory machine-readable storage medium of claim 16, wherein the processing circuitry is further configured to perform operations comprising:
    accessing a plurality of inspection rules or policies using at least one application programming interface (API); and
    determining the priority category based on inspection of the packet using the inspection rules or policies.

19. The at least one non-transitory machine-readable storage medium of claim 16, wherein the plurality of priority categories comprises at least a low priority packet category and a high priority packet category, and wherein when the packet is classified under the low priority packet category, the processing circuitry is further configured to perform operations comprising:
    determining whether traffic of additional packets is present in the transmit chain, the additional packets classified under the high priority packet category; and
    setting the transmission power for transmitting the packet to a lowest transmission power within the TAS energy budget, when the traffic of additional packets is present in the transmit chain.

20. A method for controlling transmission power in a wireless device, the method comprising:
    classifying a packet of output radio frequency (RF) signals into a priority category of a plurality of priority categories based on priority information within the packet, the output RF signals based on baseband signals within a transmit chain of the wireless device;
    determining a time average specific absorption rate (TAS) energy budget of the wireless device, the TAS energy budget based on a pre-configured regulatory power limit of the wireless device over a time interval;

determining transmission power for transmitting the packet based on the priority category and the TAS energy budget; and encoding the packet for transmission via one or more antennas using the determined transmission power.

21. The method of claim 20, wherein the priority information includes at least one of:
- a differential services code point (DSCP) tag within a header of the packet;
- a type of service (TOS) header or field associated with the packet;
- aggregation control information associated with the packet;
- a wireless frame type information, the wireless frame type information indicating the packet is associated with one of: a management frame type, a control type, or a data type; and
- information based on inferring a packet transfer reliability requirement of the packet.

22. The method of claim 20, further comprising:
accessing a plurality of inspection rules or policies using at least one application programming interface (API); and
determining the priority category based on inspection of the packet using the inspection rules or policies.

23. The method of claim 20, wherein the plurality of priority categories comprises at least a low priority packet category and a high priority packet category, and wherein when the packet is classified under the low priority packet category, the method further comprises:
determining whether traffic of additional packets is present in the transmit chain, the additional packets classified under the high priority packet category; and
setting the transmission power for transmitting the packet to a lowest transmission power within the TAS energy budget, when the traffic of additional packets is present in the transmit chain.

* * * * *